United States Patent
Komatsu et al.

(10) Patent No.: US 12,327,368 B2
(45) Date of Patent: Jun. 10, 2025

(54) IMAGE PROCESSING APPARATUS AND CONTROL METHOD OF IMAGE PROCESSING APPARATUS

(71) Applicant: CANON KABUSHIKI KAISHA, Tokyo (JP)

(72) Inventors: Satoru Komatsu, Cambridge, MA (US); Akinari Takagi, Kanagawa (JP); Koji Maeda, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 411 days.

(21) Appl. No.: 17/820,832

(22) Filed: Aug. 18, 2022

(65) Prior Publication Data

US 2022/0392096 A1 Dec. 8, 2022

Related U.S. Application Data

(63) Continuation of application No. PCT/JP2021/005005, filed on Feb. 10, 2021.

(30) Foreign Application Priority Data

Feb. 26, 2020 (JP) .................................. 2020-031079
Nov. 2, 2020 (JP) .................................. 2020-183896

(51) Int. Cl.
 *G06T 7/60* (2017.01)
 *G06K 15/02* (2006.01)
 (Continued)

(52) U.S. Cl.
 CPC ............ *G06T 7/60* (2013.01); *G06K 15/1822* (2013.01); *G06T 3/40* (2013.01); *G06T 7/50* (2017.01);
 (Continued)

(58) Field of Classification Search
 CPC .... G06T 7/60; G06T 3/40; G06T 7/50; G06T 2200/24; G06T 2207/20021;
 (Continued)

(56) References Cited

U.S. PATENT DOCUMENTS 10,169,856 B1 * 1/2019 Farnsworth ............. G06F 18/22
10,445,949 B2 * 10/2019 Sy .............................. G06T 7/80
 (Continued)

FOREIGN PATENT DOCUMENTS

CN 102801910 A 11/2012
CN 103685877 A 3/2014
 (Continued)

OTHER PUBLICATIONS

Huan Jia-Rong, et al., A design of the Camera's Auto-focusing System Based on the Technique of Image-recognition, May 2010, vol. 33, No. 3.

*Primary Examiner* — Gregory A Morse
*Assistant Examiner* — Ronde Lee Miller
(74) *Attorney, Agent, or Firm* — Canon U.S.A., Inc. IP Division

(57) ABSTRACT

An image processing apparatus includes an acquisition unit configured to acquire an image captured by an imaging unit, and image capturing information at the time of image capturing of the image, and a calculation unit configured to calculate an object side pixel dimension of a target subject in the image based on the image capturing information and a pixel dimension of the imaging unit, wherein the acquisition unit acquires in-focus information indicating an in-focus state of a subject in an image, as the image capturing information, and wherein the calculation unit calculates the object side pixel dimension based on the in-focus information.

23 Claims, 19 Drawing Sheets

(51) Int. Cl.
*G06T 3/40* (2024.01)
*G06T 7/50* (2017.01)
*G06V 10/22* (2022.01)
*G06V 40/16* (2022.01)

(52) U.S. Cl.
CPC ............ *G06V 10/22* (2022.01); *G06V 40/161* (2022.01); *G06T 2200/24* (2013.01); *G06T 2207/20021* (2013.01); *G06T 2207/20212* (2013.01); *G06T 2207/30201* (2013.01)

(58) Field of Classification Search
CPC . G06T 2207/20212; G06T 2207/30201; G06T 7/571; G06K 15/1822; G06V 10/22; G06V 40/161; H04N 23/959; H04N 23/67; G03B 15/00; G03B 17/18; G09G 5/00; G09G 5/36
See application file for complete search history.

(56) References Cited

U.S. PATENT DOCUMENTS

| | | | |
|---|---|---|---|
| 10,552,933 B1* | 2/2020 | Calhoon | G06V 20/10 |
| 2011/0038549 A1* | 2/2011 | Shirakawa | G06T 7/20 |
| | | | 382/209 |
| 2014/0063512 A1* | 3/2014 | Takeuchi | G06T 3/40 |
| | | | 358/1.2 |
| 2015/0116353 A1* | 4/2015 | Miura | G02B 27/0075 |
| | | | 345/632 |
| 2016/0260138 A1* | 9/2016 | Amit | G06T 3/40 |
| 2017/0116707 A1* | 4/2017 | Upendran | G06F 16/583 |
| 2020/0177797 A1* | 6/2020 | Liu | H04N 23/63 |
| 2020/0265565 A1* | 8/2020 | Hwang | G06T 5/70 |
| 2022/0030162 A1* | 1/2022 | Cramer | G06T 7/251 |
| 2022/0392096 A1* | 12/2022 | Komatsu | G06T 3/40 |
| 2023/0014102 A1* | 1/2023 | Hoyle | A61B 3/11 |
| 2023/0033956 A1* | 2/2023 | Yong | G06V 10/82 |
| 2023/0148125 A1* | 5/2023 | Tsuji | H04N 23/611 |
| | | | 348/222.1 |
| 2023/0401891 A1* | 12/2023 | Nguyen | G06V 20/40 |
| 2024/0312041 A1* | 9/2024 | German | G06T 7/62 |

FOREIGN PATENT DOCUMENTS

| | | |
|---|---|---|
| JP | 2001074602 A | 3/2001 |
| JP | 2010078677 A | 4/2010 |
| JP | 2013251656 A | 12/2013 |
| JP | 2014068333 A | 4/2014 |
| JP | 2014085608 A | 5/2014 |
| WO | 2019026923 A1 | 2/2019 |

* cited by examiner

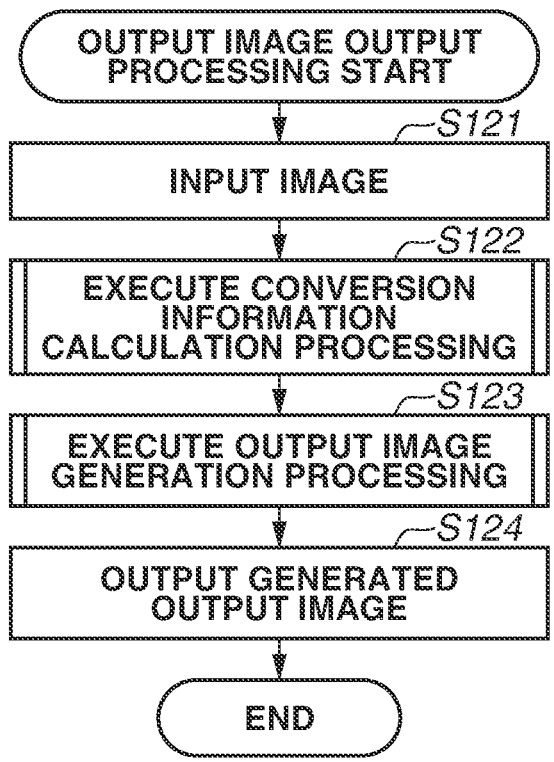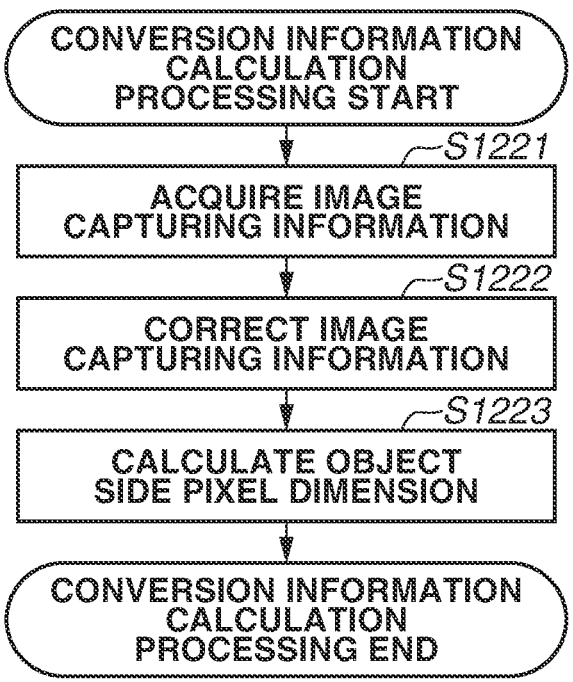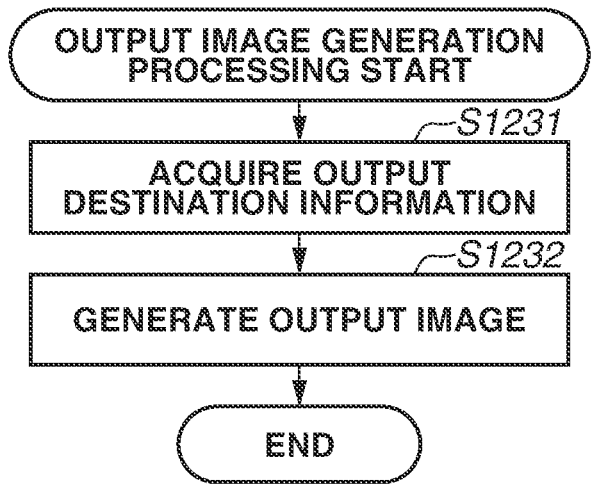

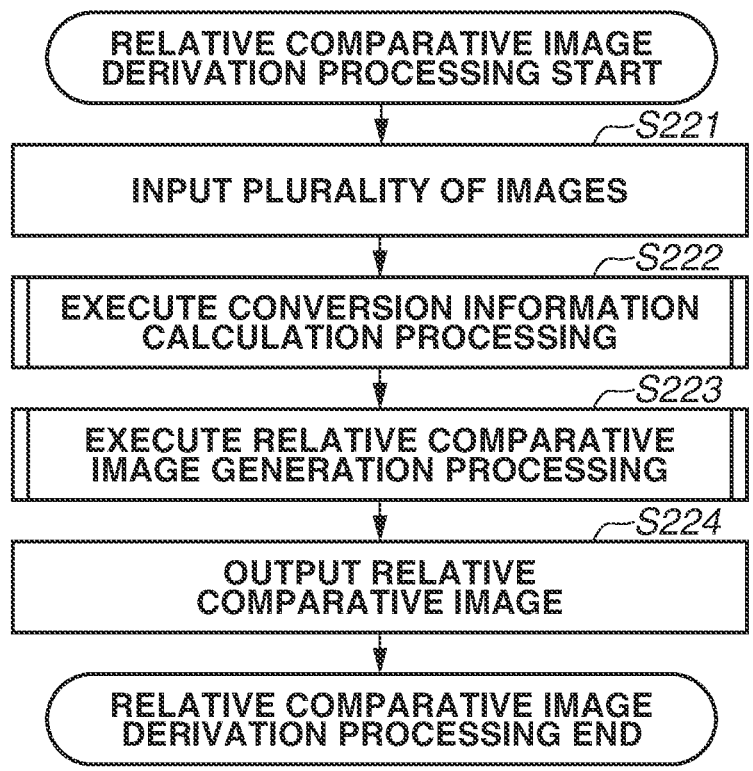
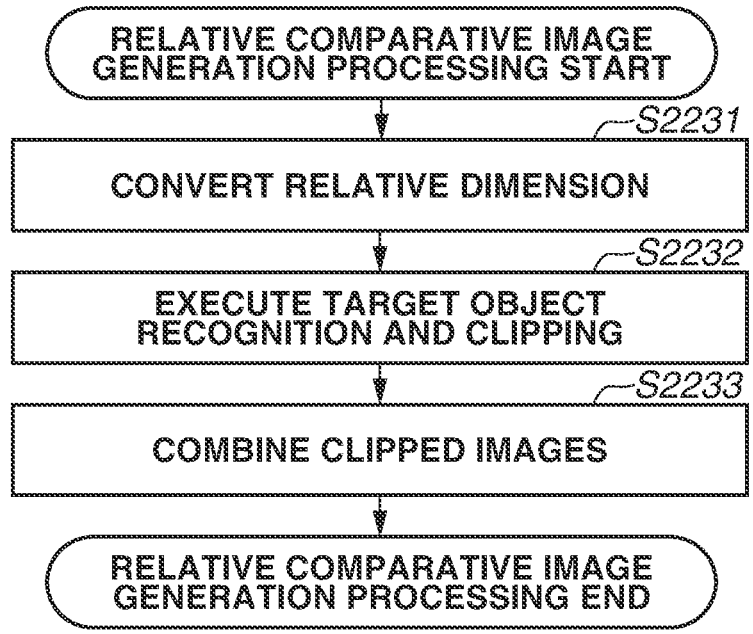

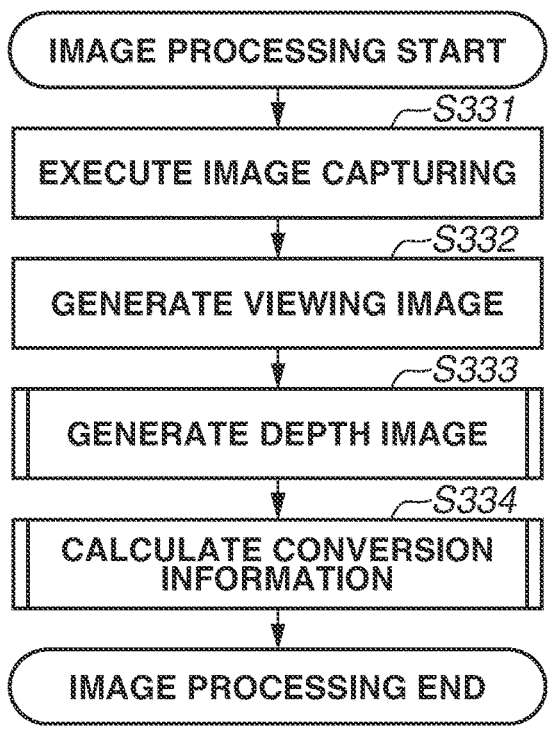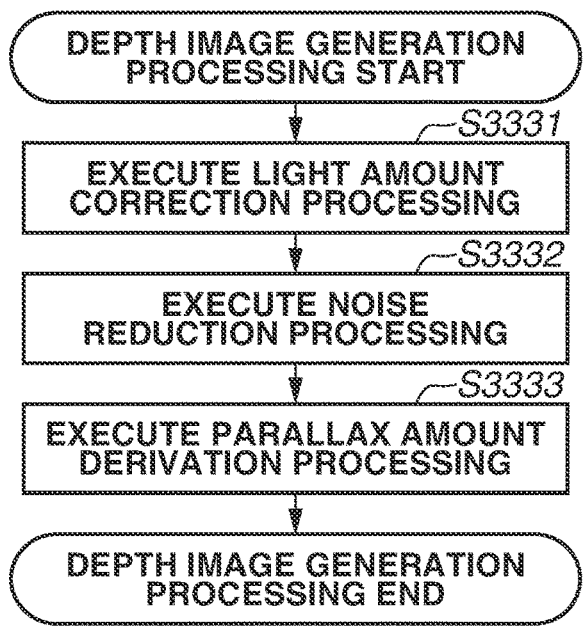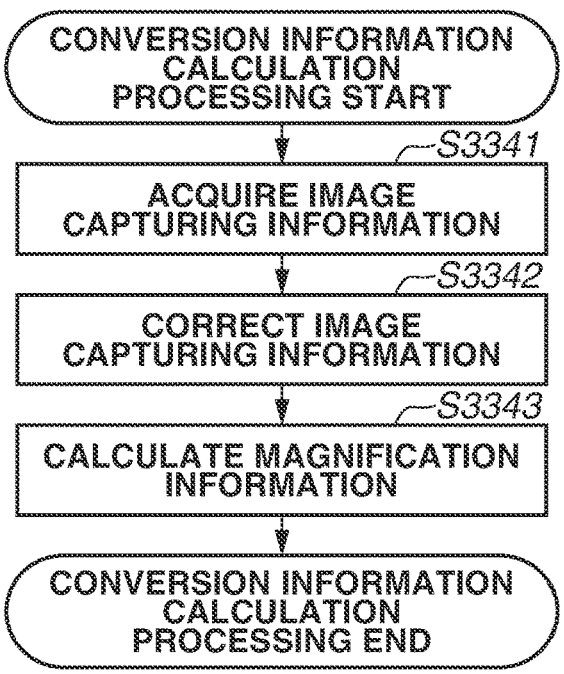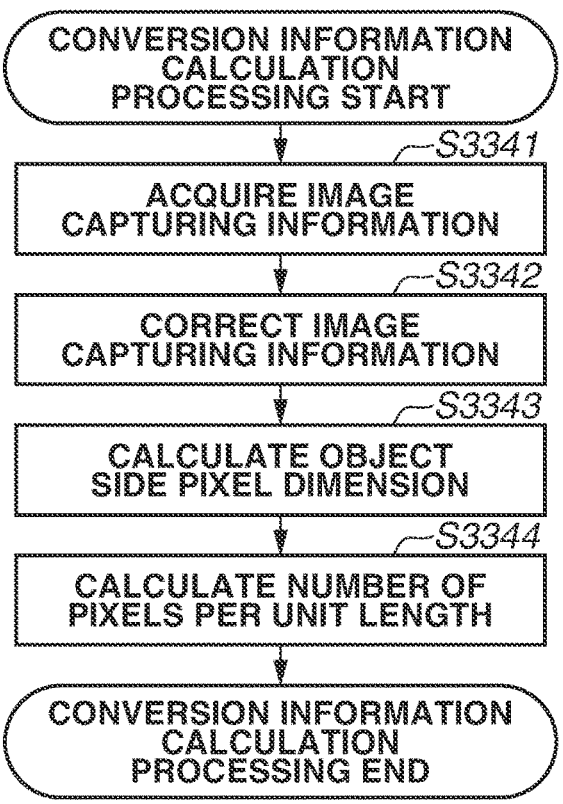

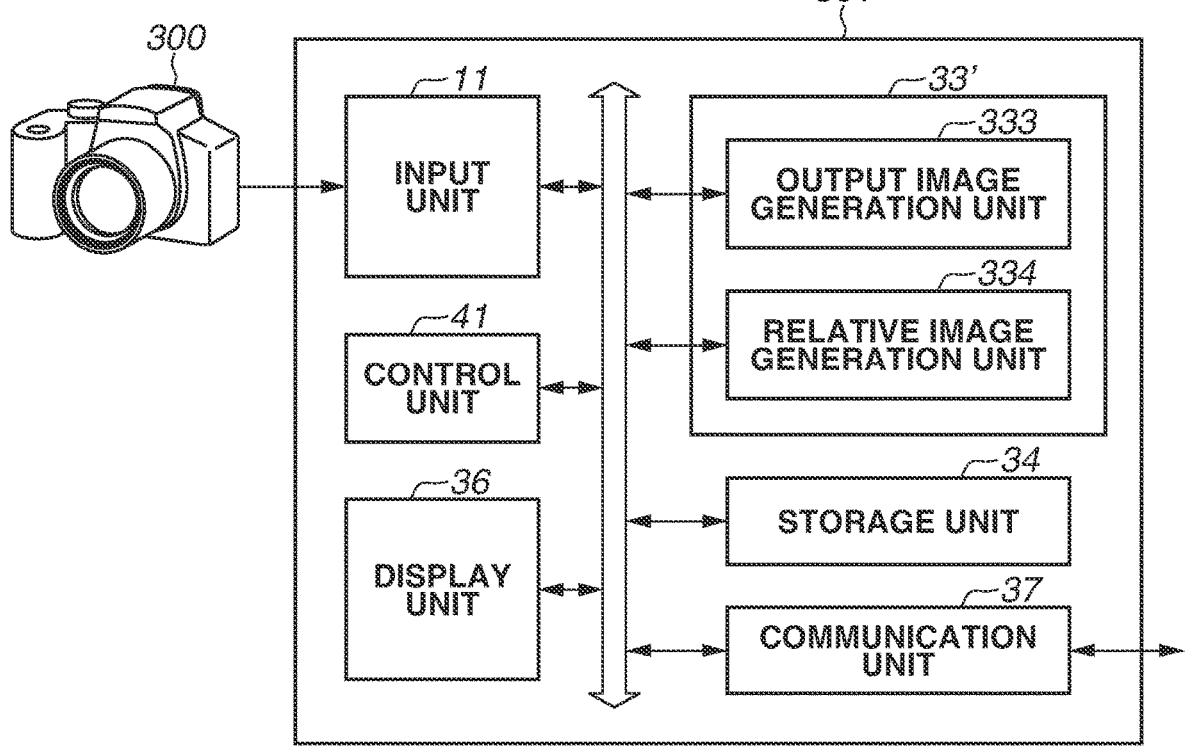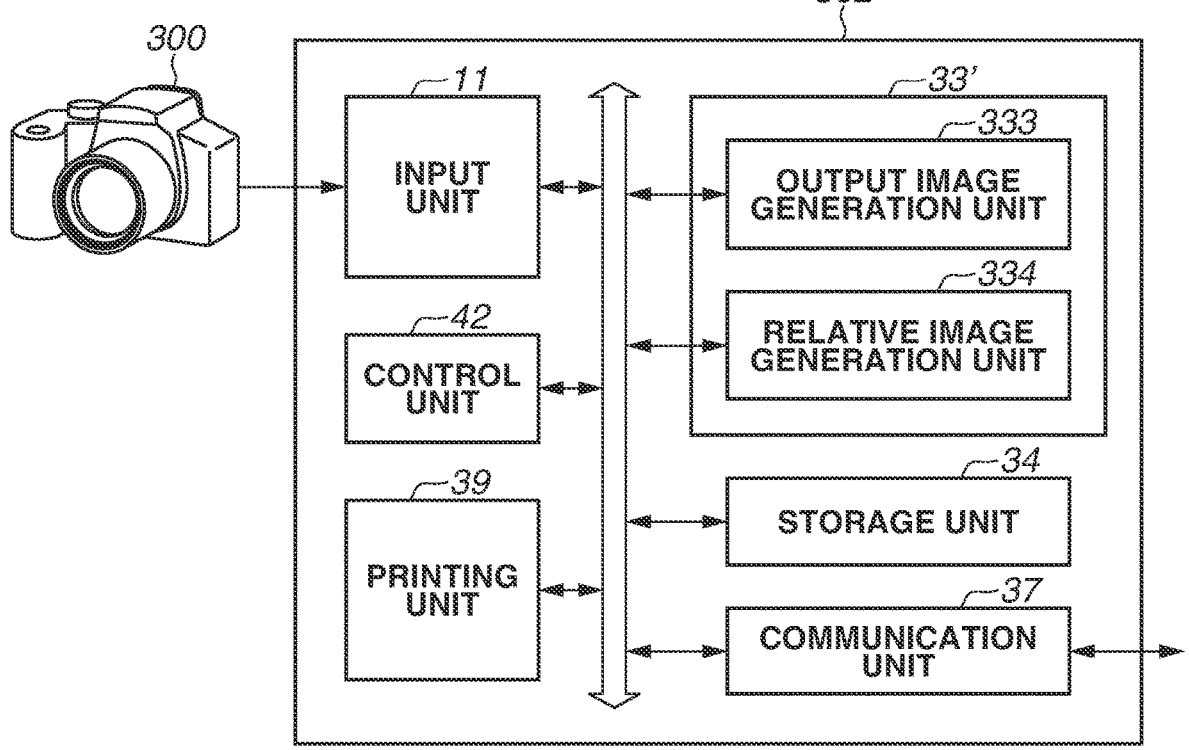

IMAGE PROCESSING APPARATUS AND CONTROL METHOD OF IMAGE PROCESSING APPARATUS

CROSS-REFERENCE TO RELATED APPLICATIONS

This application is a Continuation of International Patent Application No. PCT/JP2021/005005, filed Feb. 10, 2021, which claims the benefit of Japanese Patent Applications No. 2020-031079, filed Feb. 26, 2020, and No. 2020-183896, filed Nov. 2, 2020, all of which are hereby incorporated by reference herein in their entirety.

BACKGROUND OF THE INVENTION

Field of the Invention

The present invention relates to an image processing apparatus and an image processing method that perform processing related to a dimension of a subject in an image based on information in image capturing, and information regarding an imaging apparatus used in the image capturing.

Background Art

There is a technique of displaying a subject in an image in full scale using information in image capturing of the image.

PTL 1 discusses a display system and a method that display an image in an actual size on a screen of a display device. There has been proposed a method of acquiring information in image capturing, from specification information on a display screen displaying images, and an image stored in an Exchangeable image file format (Exif) format, calculating an actual size, and displaying an image.

CITATION LIST

Patent Literature

PTL 1: Japanese Patent Application Laid-Open No. 2010-78677

In the technique discussed in PTL 1, information stored in an Exif file is used in calculation of an actual size, but processing considering a focus state is not performed, which brings about such a problem that it is difficult to calculate a highly-accurate full scale depending on the focus state of an image. In addition, only the use in a configuration of displaying a dimension of a single subject in an image in an actual size is discussed.

In view of the above-described problems, the present invention is directed to providing an image processing apparatus and an image processing method that solve at least one of the above-described problems. More specifically, the present invention is directed to providing an image processing apparatus and an image processing method that generate an output image that can more accurately reproduce a dimension of a subject existing at a desired position in an image. Further, the present invention is also directed to providing an image processing apparatus and an image processing method that further utilize a dimension of a subject.

SUMMARY OF THE INVENTION

To achieve the above objective, an image processing apparatus according to the present invention includes an acquisition unit configured to acquire an image captured by an imaging unit, and image capturing information at the time of image capturing of the image, and a calculation unit configured to calculate an object side pixel dimension of a target subject in the image based on the image capturing information and a pixel dimension of the imaging unit, wherein the acquisition unit acquires in-focus information indicating an in-focus state of a subject in an image, as the image capturing information, and wherein the calculation unit calculates the object side pixel dimension based on the in-focus information.

Further, an image processing method according to the present invention includes an acquisition step of acquiring an image captured by an imaging unit, and image capturing information at the time of image capturing of the image, and a calculation step of calculating an object side pixel dimension of a subject in the image based on the image capturing information and a pixel dimension of the imaging unit, wherein, in the acquisition step, in-focus information indicating an in-focus state of a subject in an image is acquired as the image capturing information, and wherein, in the calculation step, the object side pixel dimension is calculated based on the in-focus information.

Further features of the present invention will become apparent from the following description of exemplary embodiments with reference to the attached drawings.

BRIEF DESCRIPTION OF THE DRAWINGS

FIG. 2A is a flowchart illustrating processing to be executed in the first exemplary embodiment.

FIG. 2B is a flowchart illustrating processing to be executed in the first exemplary embodiment.

FIG. 2C is a flowchart illustrating processing to be executed in the first exemplary embodiment.

FIG. 4A is a flowchart illustrating processing to be executed in the second exemplary embodiment.

FIG. 4B is a flowchart illustrating processing to be executed in the second exemplary embodiment.

FIG. 9A is a flowchart illustrating processing to be executed in the third exemplary embodiment.

FIG. 9B is a flowchart illustrating processing to be executed in the third exemplary embodiment.

FIG. 9C is a flowchart illustrating processing to be executed in the third exemplary embodiment.

FIG. 9D is a flowchart illustrating processing to be executed in the third exemplary embodiment.

FIG. 10A is a block diagram illustrating a functional configuration of a display device according to the third exemplary embodiment.

FIG. 10B is a block diagram illustrating a functional configuration of a printing apparatus according to the third exemplary embodiment.

DESCRIPTION OF THE EMBODIMENTS

First Exemplary Embodiment

Figure 1:
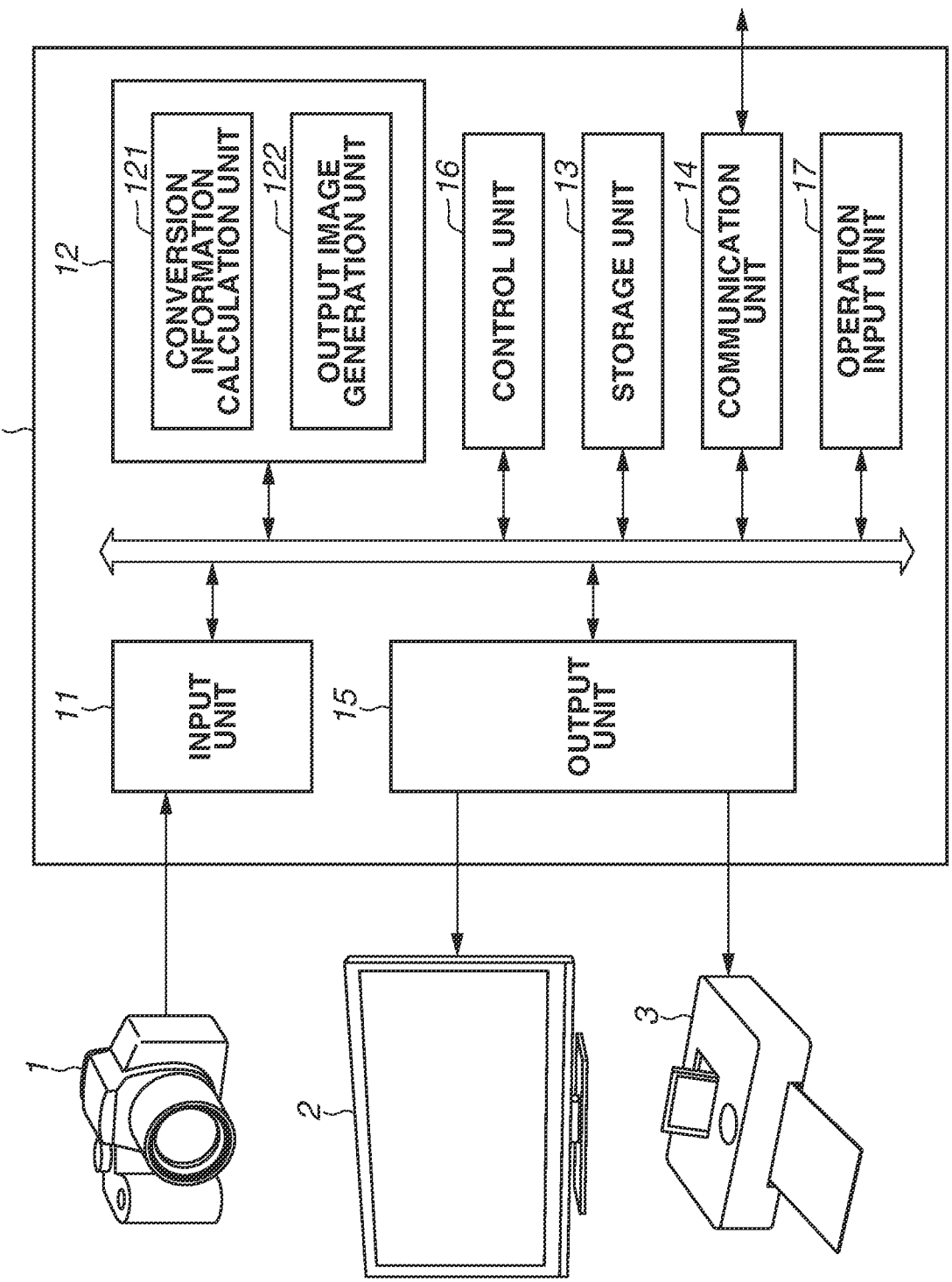
FIG. 1 is a block diagram illustrating a functional configuration of an image processing apparatus according to a first exemplary embodiment.

Hereinafter, exemplary embodiments will be described in detail with reference to the attached drawings. The following exemplary embodiments are not intended to limit the invention set forth in the appended claims. A plurality of features are described in the exemplary embodiments, but not all of the plurality of features are essential to the invention, and the plurality of features may be arbitrarily combined. Furthermore, in the attached drawings, identical or similar configurations are assigned identical reference numerals, and the redundant description will be omitted.

In an exemplary embodiment to be described below, an example of an image processing apparatus in which an image processing apparatus of the present invention is embedded will be described as an example of an image processing apparatus. This image processing apparatus acquires a captured image acquired from an imaging apparatus such as a digital camera, and outputs a full-scale image of a subject to an output device such as a display device and a printing apparatus. The present invention is applicable to any device that can calculate a full-scale image based on a captured image, and image capturing information and output device information that correspond to the captured image.

<Configuration of Image Processing Apparatus 100>

A configuration of an image processing apparatus 100 will be described with reference to FIG. 1. FIG. 1 is a block diagram illustrating a functional configuration of the image processing apparatus 100.

An input unit 11 is an interface (I/F) that acquires image information (image data) captured by an imaging apparatus such as a digital camera 1, and image capturing information (image capturing condition, image processing parameter, etc.) from the digital camera 1 or another external apparatus.

An image processing unit 12 performs various types of image processing such as luminance or color conversion processing, correction processing of defective pixels, shading, and noise components, filter processing, and image composition processing, and various types of calculation for image processing on image data acquired from the input unit 11, a storage unit 13, or a communication unit 14. The image processing unit 12 includes a conversion information calculation unit 121 and an output image generation unit 122. The conversion information calculation unit 121 executes, based on image capturing information of an image of image data to be acquired, calculation for converting, for example, a size of a pixel (pixel dimension) in an image sensor of the digital camera 1 that has acquired the image data into a size in a space in a desired subject distance. The output image generation unit 122 generates an output image using the pixel dimension in a subject space that has been calculated by the conversion information calculation unit 121, and device information (output destination information) about a device that displays or prints a subject in full scale. The output image is an image on which image conversion has been executed in such a manner that a final output on an output destination device (display on a display device or a printed product from a printing device) is in full scale. Here, the image processing unit 12 can include a logic circuit. Furthermore, as another configuration, the image processing unit 12 can include a central processing unit (CPU) and a memory storing a calculation processing program.

The storage unit 13 includes a recording medium such as a memory storing various types of information such as image data and parameters that are input via the input unit 11 or the communication unit 14. Further, the storage unit 13 stores the output image, which has been generated by the output image generation unit 122 and converted in such a manner that a subject is in full scale in an output on an output destination device, and device information about the digital camera 1 that is to be required by the conversion information calculation unit 121.

The communication unit 14 is a communication I/F that performs data transmission and reception with an external apparatus. In the present exemplary embodiment, the communication unit 14 communicates with the digital camera 1, a display 2, or a printer 3, and acquires device information about the digital camera 1, the display 2, or the printer 3 that is required by the conversion information calculation unit 121 and the output image generation unit 122.

An output unit 15 is an I/F that outputs full scale information including an output image generated by the image processing unit 12, to the display 2 or the printer 3 that is an output destination.

A control unit 16 incorporates a CPU serving as a computer, and controls each component of the entire image processing apparatus 100 via a bus based on a computer program stored in a nonvolatile memory.

<Output Image Generation Processing>

Regarding output image generation processing which is executed by the image processing apparatus 100 of the present exemplary embodiment and in which an output image is generated by image-processing an input image for a full-scale output of an imaged subject, specific processes will be described with reference to a flowchart in FIG. 2A. Processing corresponding to the flowchart is implemented by the control unit 16 or each component operating by the control unit 16 reading out a corresponding processing program stored in a nonvolatile memory in the control unit 16, loading the processing program onto a volatile memory in the control unit 16, and executing the processing program, for example.

In step S121, the image processing unit 12 acquires image data of a captured image to which information in image capturing is attached, from the digital camera 1 via the input unit 11. The input unit 11 may acquire similar image data provided to which information in image capturing is attached, from another external apparatus.

In step S122, the conversion information calculation unit 121 calculates conversion information for converting a dimension of one pixel in a captured image into a dimension that occupies in a space in a desired subject distance. Conversion information calculation processing will be described with reference to a flowchart in FIG. 2B. Processing corresponding to the flowchart is implemented by the control unit 16 or each component operating by the control unit 16 reading out a corresponding processing program stored in a nonvolatile memory in the control unit 16, loading the processing program onto a volatile memory in the control unit 16, and executing the processing program, for example.

In step S1221, image capturing information used when a captured image is captured is acquired from information attached to the captured image such as data (metadata) of a tag stored in an Exchangeable image file format (Exif) format. The image capturing information to be acquired here is information on a camera name (camera ID) of a camera used in the image capturing of an acquired image, a lens name (lens ID), a focal length, an F-number, and a subject distance, for example. Generally, image capturing information such as a focal length, an F-number, and a subject distance that is stored in the Exif format is a value rounded off to an integer, or a discrete value with low resolution. For example, a focal length of a lens is rounded off to the nearest integer and stored, and a value after the decimal point cannot be acquired. Further, in an inner focus lens, a focal length varies depending on an in-focus distance, but even if the in-focus distance varies, the same focal length is stored in an image file. In this manner, because information stored in a tag in the Exif format is not a precise value, in a case where magnification conversion information is calculated using an acquired value, an error of a final full-scale image with respect to an actual size of a subject becomes larger. As a countermeasure for such an error, information regarding an in-focus state at the time of image capturing is described in a maker note region in the Exif format, and stored as image capturing information in the imaging apparatus. The information regarding an in-focus state is information such as a step or a position of a motor driven for focusing, or a step or a position of a motor that has driven a zoom lens. In step S1221, the information regarding an in-focus state (in-focus information) is also acquired in addition to the above-described information, and is used in the correction of image capturing information in next step S1222.

Furthermore, lens aberration influences a captured image, and due to the aberration, a full-scale output may fail to be correctly obtained at the time of the generation of an output image for a full-scale output. In a case where distortion aberration remains, distortion occurs in an image, and a correct full-scale output cannot be obtained due to the influence of distortion. It is accordingly desirable to also acquire information regarding distortion aberration as image capturing information. A value corresponding to a lens state in image capturing is recorded in a manufacturer note region in the Exif format at the time of image capturing, and the distortion aberration information is acquired by reading out the recorded value in step S1221. Alternatively, distortion aberration information of a plurality of cameras and lenses is prestored in the storage unit 13 as information for correction, and the distortion aberration information can also be acquired by reading out the distortion aberration information from the storage unit 13 based on a camera name and a lens name at the time of image capturing, and focal length information.

As another type of aberration information, axial chromatic aberration information also becomes necessary for generating an output image for a highly-accurate full-scale output. In a case where axial chromatic aberration is large, depending on a subject color, a lens in-focus state varies even if subjects exist in the same distance, and a different subject distance is consequently output. To correct the error in subject distance, axial chromatic aberration information is necessary. Similarly to distortion aberration information, axial chromatic aberration information may be recorded in a maker note region in the Exif of a captured image and read out, or may be prestored in the storage unit 13 as information for correction and corresponding information may be read out based on camera and lens information.

In step S1222, using acquired image capturing information including in-focus state information, the control unit 16 executes correction of the acquired image capturing information. In step S1222, correction information for correcting image capturing information of a corresponding model that is prestored in the storage unit 13 is acquired based on the acquired camera name and lens name. Correction information for a model that is not stored in the storage unit 13 may be acquired from the outside via the communication unit 14.

One of the correction information here is table information indicating an in-focus state and a value of a focal length corresponding thereto that is to be used for acquiring a variation amount of a focal length with respect to an in-focus state, and a focal length is corrected using the table information. In a case where an in-focus state is controlled, for example, based on 100 divided states in a distance from a closest distance to an infinite distance, focal length information corresponding to the 100 different in-focus states is stored. Alternatively, by storing a relationship between an in-focus state and a focal length corresponding thereto can be stored as a function, and a focal length corresponding to an input in-focus state can be calculated and acquired. The information also becomes necessary to correct a difference from a design value of a focal length that is caused by manufacturing. It becomes possible to reduce an average manufacturing error using focal length distribution information that is based on a manufacturing error. Information regarding a manufacturing error may be made acquirable from an image file in such a manner that a focal length is measured for each individual device at the time of manufacturing, the information is stored in a storage medium attached to a camera main body or a lens, and the stored information is read at the time of image capturing and recorded in a maker note region of a captured image.

Other correction information includes information for correcting a subject distance. As a subject distance at the time of image capturing that is attached to a captured image, a distance from an in-focus subject to a foremost surface of a lens or a distance from an in-focus subject to an image sensor is generally stored. Thus, the definition of a subject distance for each camera is prestored into the storage unit 13 as one of correction information, and the definition of an acquired subject distance is determined based on an acquired camera name. The correction information further includes information for converting an acquired subject distance into a distance from a subject to a front principal point or a front focal point. These pieces of correction information can be generated based on design information about a lens and design information about a lens barrel. Because a front principal point (principal point position of an optical system) or a front focal point position varies depending on the in-focus state, difference position information from a reference position (lens foremost surface or image sensor plane) of a front principal point or a front focal point corresponding to each in-focus state is stored as correction information as a table or a function. Finally, a focal length is corrected based on an acquired subject distance at the time of image capturing, the definition of a subject distance of a camera used in image capturing, and difference position information from a reference position to a front principal point or a front focal point position that is based on the definition.

As other information for correcting a subject distance, the above-described axial chromatic aberration information is also included. Due to axial chromatic aberration, an in-focus position on an image side varies depending on the color among subjects existing in the same distance, and a subject distance to be output consequently varies. For correcting the influence, using lens design information, axial chromatic aberration amounts in a plurality of visible wavelengths (for example, central wavelengths of color filters of an image) are preliminarily calculated and stored. Furthermore, color information about an in-focus region on an in-focus subject (luminance information about each color component of a corresponding image region) is acquired. From a mix ratio of color components, and a value of axial chromatic aberration, a shift from a reference in-focus position on the image side is calculated and the correction of a subject distance is performed. The reference in-focus position on the image side is an in-focus position in a color of a reference subject used when a subject distance is calculated. For example, in a case where a monochrome chart is used as a reference, a reference in-focus position on the image side can be calculated from luminance information about the color components and axial chromatic aberration information.

In step S1223, now, a magnification at the time of image capturing is calculated based on the corrected focal length and subject distance. When a distance from a subject to a front focal point is denoted as a subject distance x, and a focal length is denoted by f, a magnification m is obtained by the following formula (1):

$$m = x/f \qquad \text{Formula (1)}.$$

The magnification here is set as an enlargement ratio for converting a subject on an imaging plane into an actual size on an object side.

In a case where a subject distance is set as a distance from a subject to a front principal point (subject distance is denoted by S), a distance S' from a rear principal point to an image plane may be calculated using the subject distance S and a focal length x, and the magnification m may be obtained by the following formula (2):

$$m = S'/S \qquad \text{Formula (2)}.$$

Furthermore, in step S1223, the control unit 16 acquires a pixel dimension p (pixel pitch, interval between pixels) of an image sensor used in image capturing. By calculating a product of the pixel dimension p and the magnification m, a size of one pixel of the image sensor in a subject distance (object side pixel dimension indicating a length or a size in a real space of a subject existing over one pixel) can be calculated, and an actual size of the subject can be obtained from the number of pixels over which the subject extends.

Herein, the case where a magnification is obtained from the corrected focal length and the subject distance has been described, but highly-accurate magnification information can be preliminarily calculated based on lens design information and stored. In this case, a table corresponding to information such as a step or a position of a motor driven for focusing, or a step or a position of a motor that has driven a zoom lens is stored, and a magnification suitable for an image capturing situation is calculated from these values. The table of the magnification information needs not be stored in such a manner as to correspond to all values that can be taken by the motor. Discrete values may be stored and values between the discrete values can also be calculated by interpolation. In addition, function fitting may be performed on magnification information and values of the motor, and a coefficient thereof may be stored.

Referring back to the flowchart in FIG. 2A, in step S1213, the control unit 16 and the output image generation unit 122 perform generation of an output image for a full-scale output that is suitable for an output destination device of an image. The output image generation processing will be described with reference to a flowchart in FIG. 2C.

In step S1231, information about an output destination of an output image is acquired. For example, in a case where an output image is output by the printer 3 as a printed product, information regarding a sheet dimension to be output is acquired. For example, in a case where an output image is displayed on the display 2, a display screen dimension and a display screen resolution of the display 2 are acquired. Here, the display screen resolution indicates the number of display pixels on the display screen.

In step S1232, the output image generation unit 122 generates an output image suitable for an output destination, using the acquired output destination information and the object side pixel dimension. In a case where an output is a printed product output from the printer 3 or the like, by dividing a sheet dimension by the object side pixel dimension, the number of pixels in a longitudinal direction and a traverse direction of a captured image with respect to the sheet dimension can be calculated. The number of pixels is regarded as the number of pixels of an output image. In a case where the number of pixels of a captured image is larger than the calculated number of pixels of an output image, an output image may be generated by selecting and extracting a required region corresponding to the number of pixels of the output image, from the captured image. On the other hand, in a case where the number of pixels of a captured image is smaller than the number of pixels set as the calculated number of pixels of an output image, the number of pixels of the captured image is caused to match the number of pixels of the output image by adding margin pixels to the captured image, and an output image is generated. When a region in an image is extracted, it is most appropriate to select the region such that an in-focus subject is included therein, and further, it is desirable to select the region in such a manner that margin addition does not occur as far as possible.

On the other hand, in a case where an output destination of an output image is a display device such as the display 2, using a display screen dimension of the display 2 and an object side pixel dimension of an image sensor, the number of pixels in the longitudinal and traverse directions of a captured image that are required for display is calculated similarly to the case where the output image is printed. Subsequently, a necessary region is extracted from the captured image in accordance with the calculated number of pixels. The processing causes a display screen dimension to match an image dimension in a subject distance of the extracted captured image. Next, a conversion magnification is calculated from the calculated number of pixels and a display screen resolution, and an output image for a full-scale output on the display 2 is generated by executing enlargement/reduction processing on the extracted captured image in such a manner that the number of pixels of the extracted captured image matches the display screen resolution.

In step S124, the image processing unit 12 outputs the generated output image to an output destination device via the output unit 15, and ends the output image generation processing. At this time, the generated output image may be recorded into the storage unit 13 together with output destination device information such as a print sheet dimension, a display screen dimension, and a display screen resolution.

As described above, according to the present exemplary embodiment, by using image capturing information attached to a captured image, and correction information for enhancing the accuracy of the image capturing information, an output image that can more accurately reproduce the dimension of a subject existing at a desired position in an image can be generated.

Second Exemplary Embodiment

In the first exemplary embodiment, the description has been given of a configuration in which information for converting an image to output a subject in a captured image in full scale is highly accurately calculated, output device information is acquired, and an output image for a full-scale output is generated. In a case where information for outputting a subject in full scale is calculated, output can be performed in such a manner that an actual size of a subject is recognized by comparison with another object, without necessarily generating an output image for outputting a subject in full scale. In view of the foregoing, in the present exemplary embodiment, the description will be given of an image processing apparatus that outputs an image so that relative dimension comparison can be performed considering an actual size, by using a plurality of captured images as input and calculating full scale conversion information of each of the plurality of captured images. Hereinafter, a difference from the first exemplary embodiment will be described, already-allocated reference signs and symbols are used for matters similar to those in the first exemplary embodiment, and detailed descriptions there will be accordingly omitted. Such a description omission method is similarly applied to exemplary embodiments to be described below.

Figure 3:
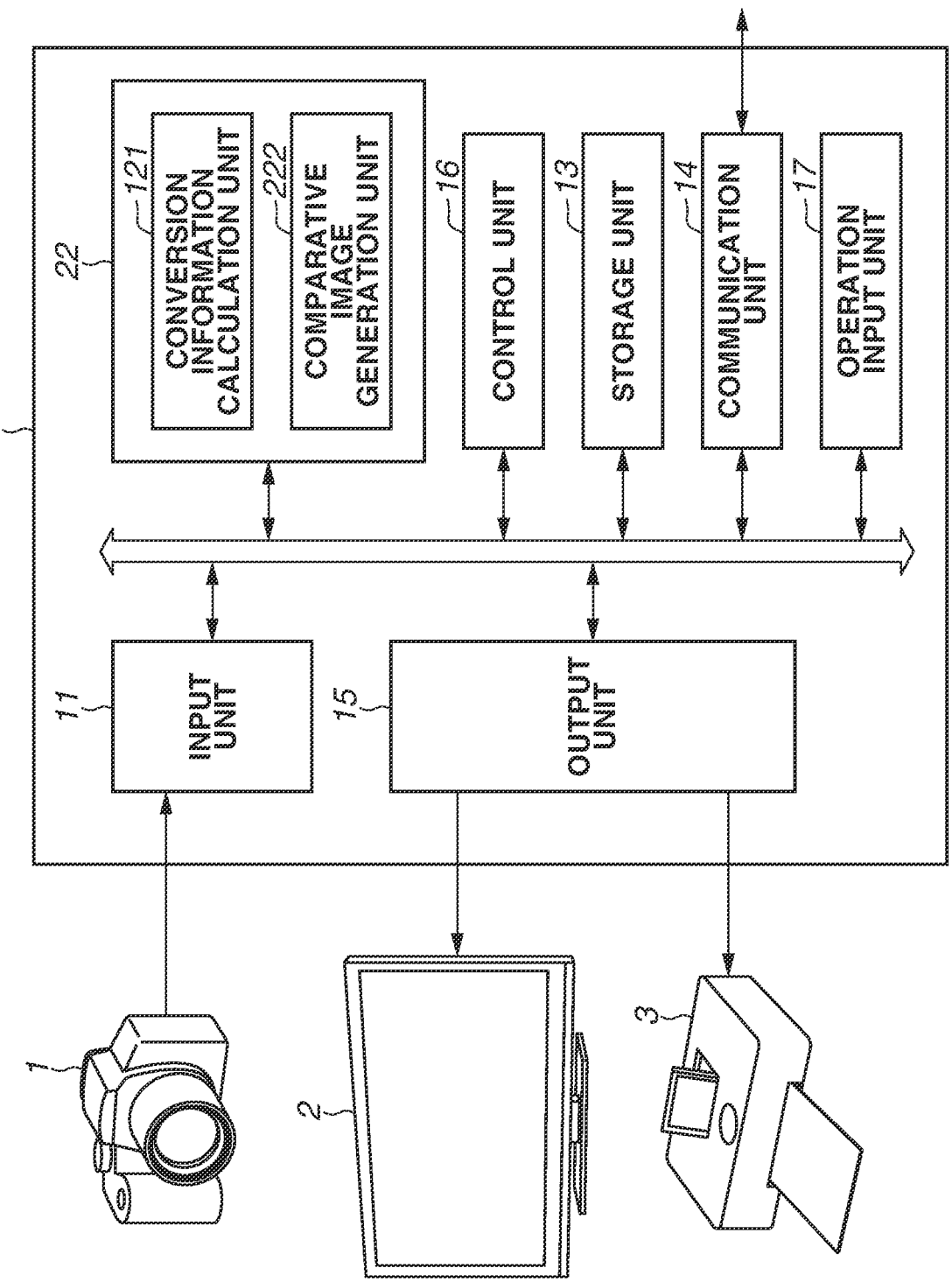
FIG. 3 is a block diagram illustrating a functional configuration of an image processing apparatus according to a second exemplary embodiment.

A configuration of an image processing apparatus 200 according to the present exemplary embodiment will be described with reference to FIG. 3. In the present exemplary embodiment, an image processing unit 22 is characterized by including a comparative image generation unit 222. The configuration other than the image processing unit 22 is similar to that of the first exemplary embodiment. Alternatively, the comparative image generation unit 222 may be included in addition to the output image generation unit 122 included in the first exemplary embodiment, and the configuration of the first exemplary embodiment may also be made executable.

<Relative Comparison Image Generation Processing>

Regarding relative image generation processing for generating a relative image that is to be executed by the image processing apparatus 200 of the present exemplary embodiment, specific processes will be described with reference to a flowchart in FIG. 4A. Processing corresponding to the flowchart is implemented by the control unit 16 or each component operating by the control unit 16 reading out a corresponding processing program stored in a nonvolatile memory in the control unit 16, loading the processing program onto a volatile memory in the control unit 16, and executing the processing program, for example.

In step S221, the image processing unit 22 acquires a plurality of captured images to which information at the time of image capturing is attached, from the digital camera 1 or an external storage device via the input unit 11.

In step S222, similarly to the first exemplary embodiment, the conversion information calculation unit 121 calculates, for each of the captured images, conversion information for calculating a dimension in a space in a desired subject distance that is converted from a dimension of one pixel in the captured image.

In step S223, the comparative image generation unit 222 generates a relative image by which a plurality of subjects in captured images can be relatively compared considering actual sizes. Relative image generation processing will be described with reference to a flowchart in FIG. 4B and FIGS. 5A to 5G.

Figure 5A:
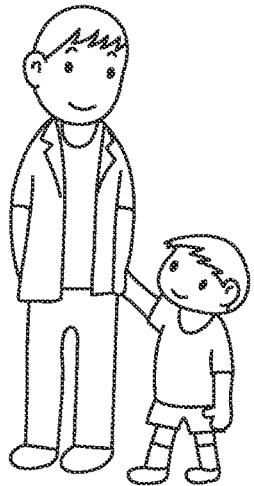
FIG. 5A is a diagram illustrating processing to be executed in the second exemplary embodiment.
Figure 5B:
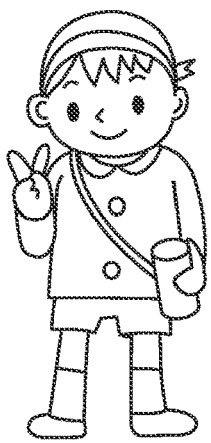
FIG. 5B is a diagram illustrating processing to be executed in the second exemplary embodiment.
Figure 5C:
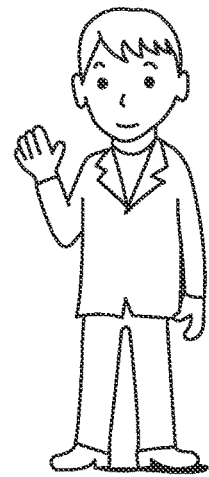
FIG. 5C is a diagram illustrating processing to be executed in the second exemplary embodiment.

In step S2231, the control unit 16 performs conversion of the images in such a manner that pixel dimensions (object side pixel dimensions) in a subject distance of the plurality of input captured images become equal to each other. First of all, a reference captured image (reference image) is selected from among a plurality of input captured images as illustrated in FIGS. 5A to 5C. Any image may be selected as the reference image, or the user may select the reference image at the time of image input. Further, in a case where the resolution of a relative image that is a final output is to have high resolution, a captured image having the smallest object side pixel dimension calculated in step S222 is selected. In contrast, in a case where an image with low resolution is required, a captured image having the largest calculated object side pixel dimension is selected. After the reference image is determined, from an object side pixel dimension Ls of the reference image and an object side pixel dimension Lr of another captured image (comparative image), an enlargement/reduction ratio Ri of the comparative image for causing the pixel dimension of the comparative image to match the pixel dimension of the reference image is calculated using the following formula (3).

$$Ri = Lr/Ls \qquad \text{Formula (3)}$$

Figure 5D:
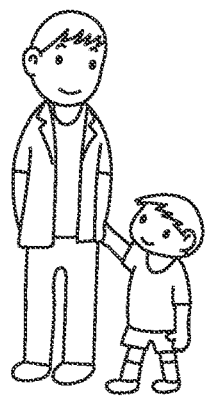
FIG. 5D is a diagram illustrating processing to be executed in the second exemplary embodiment.
Figure 5E:
FIG. 5E is a diagram illustrating processing to be executed in the second exemplary embodiment.
Figure 5F:
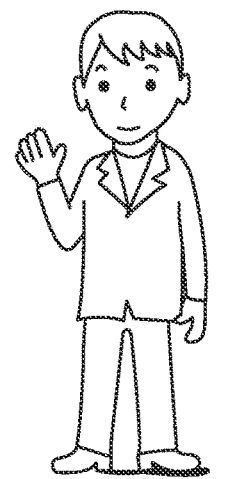
FIG. 5F is a diagram illustrating processing to be executed in the second exemplary embodiment.

The enlargement/reduction ratio Ri is calculated for each comparative image, and enlargement/reduction processing is executed on each comparative image in accordance with the enlargement/reduction ratio Ri. By this processing, the object side pixel dimensions of all the enlarged/reduced input captured images (processed images will be referred to as enlarged/reduced captured images) become the same dimension as the object side pixel dimension of the reference image as illustrated in FIGS. 5D to 5F.

In step S2232, the control unit 16 recognizes a subject in each enlarged/reduced captured image and extracts a subject region of a specific subject. As an example of subject recognition and region identification, person recognition in person images as illustrated in FIGS. 5A to 5G will be described. The person recognition uses machine learning, and performs human detection and region identification using a learning result. In a case where a plurality of persons is detected in one enlarged/reduced captured image as illustrated in FIG. 5D, the same person appearing in another enlarged/reduced captured image is identified using a face recognition technique, and a region of the identified person is extracted. By this processing, dimension changes of the same person over time can be compared. Further, without being limited to the present exemplary embodiment, when a plurality of input images is preliminarily acquired in step S221, an image from which a desired subject is recognized (furthermore, an image from which a region of a subject is extracted, etc.) may be acquired.

Furthermore, although the region extraction is desirably executed to extract a subject along the outer rim thereof, depending on the use application, it is desired to simultaneously extract background information at the time of image capturing. In the case of simultaneously extracting background information, it is desirable to extract a rectangular region or an ellipsoidal region that is substantially circumscribed around a selected subject.

Furthermore, in the present exemplary embodiment, the description has been given of an example case where a subject is a person, but the processing can be executed on any subject, and relative comparison of dimensions between different subjects can also be performed. The selection and extraction of a subject in an enlarged/reduced captured image need not be always executed automatically, and the user may be enabled to select and extract a subject.

The processes in steps S2231 and S2232 can also be executed in a reverse order.

Figure 5G:
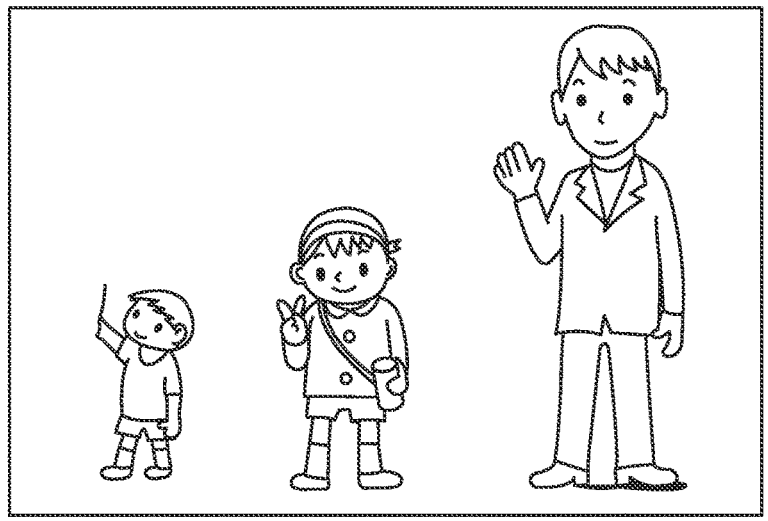
FIG. 5G is a diagram illustrating processing to be executed in the second exemplary embodiment.

In step S2233, the subjects extracted from the enlarged/reduced captured images are combined into one image, and a relative image as illustrated in FIG. 5G is generated. It is desirable to adjust the size in such a manner that the entire image of the relatively largest subject falls within the composite image, and combine another subject in a correct relative dimension with reference to the largest subject. Alternatively, a reference subject may be set, and the size may be adjusted in such a manner that the entire image of the reference subject falls within the composite image, and another subject may be combined so as to have a correct relative dimension. As for the arrangement of subjects in an image, it is desirable to arrange the subjects in a horizontal direction or a vertical direction in order of dimension or in order of image capturing date and time. Information regarding image capturing date and time becomes available if the information is acquired when image capturing information is acquired in step S1221.

Herein, the description has been given of a case where region extraction is executed after selecting a plurality of subjects, and the selected subjects are arranged in relative sizes adjusted based on a reference image; however, a background image can be selected and set as a reference image. By arranging a selected subject after enlarging or reducing the subject according to an actual size of the background image in such a manner that the relative sizes match, a difference in size between a background and a subject can be compared.

Further, subjects need not be always arranged automatically. Similarly to the processing in step S2232, the user may arrange the subjects. Furthermore, when a composite image that enables relative comparison is dialogically generated together with the user, it is desirable to detect the largest subject each time the user selects subjects, and generate and display a composite image while performing enlargement/reduction processing in such a manner that the largest subject does not fall outside the image.

In a case where a background image has a different object side pixel dimension or distance information depending on the position in a screen, in accordance with a position on the background image at which the user arranges a subject, a relative size of the subject may be changed. For example, in a case where a background image has depth, in accordance with a distance, a subject is displayed in a relatively larger size in a case where the subject is arranged on the front side, and the subject is displayed in a relatively smaller size in a case where the subject is arranged in the distance.

In step S224, the image processing unit 22 outputs the generated relative image to an output destination device via the output unit 15 and ends the relative image generation processing. Alternatively, the generated relative image is stored in the storage unit 13 and the relative image generation processing is ended.

According to the present exemplary embodiment, by calculating conversion information for conversion into an actual size, from a plurality of captured images, and generating an image in which subjects in the plurality of captured images are arranged after performing enlargement/reduction based on the conversion information, an image that enables relative dimension comparison considering an actual size can be generated.

Third Exemplary Embodiment

In the first and second exemplary embodiments, the description has been given of a configuration in which conversion information calculation processing and output image generation processing for a full-scale output or relative image generation processing are executed by the same image processing apparatus. The conversion information calculation processing can be embedded in and executed by an imaging apparatus as a part thereof, and actual size image generation processing and relative image generation processing can be embedded in and executed by an output device such as a printing apparatus or a display device. In view of the foregoing, in the present exemplary embodiment, the description will be given of an image processing apparatus in which conversion information calculation processing, and actual size image generation processing and relative image generation processing are separately embedded into an imaging apparatus and an output apparatus.

<Imaging Apparatus>

Figure 6:
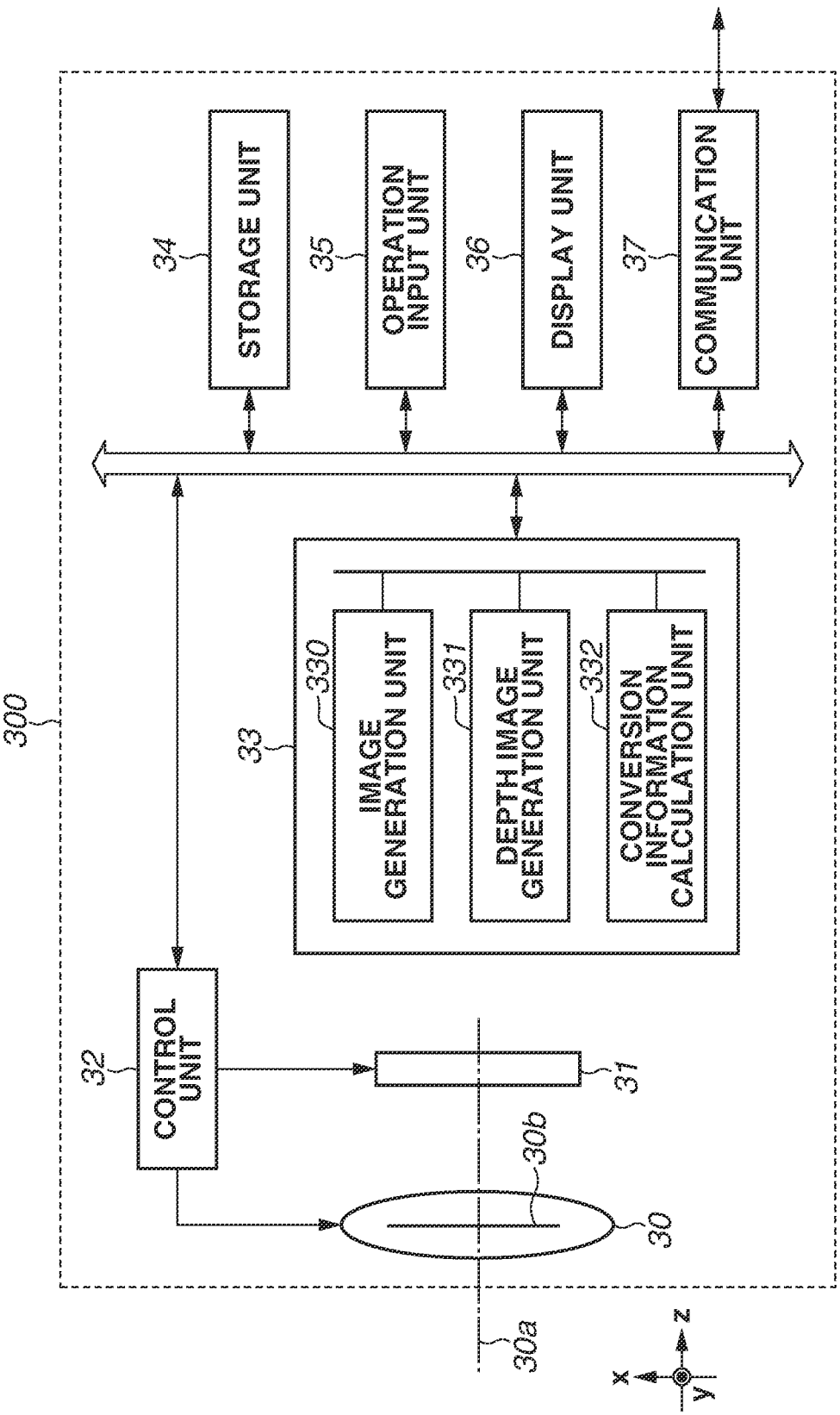
FIG. 6 is a block diagram illustrating a functional configuration of an imaging apparatus according to a third exemplary embodiment.

A configuration of a digital camera 300 will be described with reference to FIG. 6. As illustrated in FIG. 6, in the present exemplary embodiment, a conversion information calculation processing unit is included in an image processing unit 33.

An imaging optical system 30 includes a lens unit included in the digital camera 300, or a lens device attachable to a camera main body unit, and forms an optical image of a subject on an image sensor 31. The imaging optical system 30 includes a plurality of lenses arranged in a direction of an optical axis 30a, and includes an exit pupil 30b at a position distant from the image sensor 31 by a predetermined distance. In this specification, a direction parallel to the optical axis 30a is defined as a z direction (depth direction). In other words, the depth direction is a direction in which a subject exists in a real space with reference to the position of the digital camera 300. In addition, a direction orthogonal to the optical axis 30a and parallel to a horizontal direction of the image sensor 31 is defined as an x direction, and a direction orthogonal to the optical axis 30a and parallel to a vertical direction of the image sensor 31 is defined as a y direction.

The image sensor 31 is a charge-coupled device (CCD) image sensor or a complementary metal-oxide semiconductor (CMOS) image sensor, for example. The image sensor 31 performs photoelectric conversion on a subject image formed on an imaging plane via the imaging optical system 30, and outputs an image signal related to the subject image. The image sensor 31 of the present exemplary embodiment has a function of outputting a signal that enables distance measurement of an imaging plane phase difference method as described below, and outputs a parallax signal for generating distance information indicating a distance (subject distance) from an imaging apparatus to a subject, in addition to a captured image.

A control unit 32 includes a central processing unit (CPU) or a microprocessor, and controls operations of components included in the digital camera 300. For example, the control unit 32 performs autofocus (automatic focus adjustment: AF) at the time of image capturing, changes a focus (in-focus) position, changes an F-number (aperture value), and imports images. The control unit 32 also controls the image processing unit 33, a storage unit 34, an operation input unit 35, a display unit 36, and a communication unit 37.

The image processing unit 33 executes various types of image processing included in the digital camera 300. The image processing unit 33 includes an image generation unit 330, a depth image generation unit 331, and a conversion information calculation unit 332. The image processing unit 33 includes a memory to be used as a work region for image processing. The image processing unit 33 can be configured of a CPU and a memory storing calculation processing programs, aside from the configuration using a logic circuit.

The image generation unit 330 performs various types of signal processing such as noise removal, demosaicing, luminance signal conversion, aberration correction, white balance adjustment, and color correction on an image signal output from the image sensor 31. Image data (captured image) output from the image generation unit 330 is stored in a memory or the storage unit 34, and is used by the control unit 32 for image display on the display unit 36 or output to an external apparatus via the communication unit 37.

The depth image generation unit 331 generates a depth image (depth distribution information) indicating a distribution of depth information, based on an obtained signal related to a distance measuring image signal that is obtained from the image sensor 31 to be described below. Here, the depth image is two-dimensional information in which a value stored in each pixel is a subject distance of a subject existing in a region of a captured image that corresponds to the pixel.

In addition, the conversion information calculation unit 332 calculates conversion information for calculating a dimension in a space in a desired subject distance that is converted from a dimension of one pixel in a captured image, using control information used at the time of image capturing, information regarding the image sensor 31, and correction information generated from design information of the imaging optical system 30.

The storage unit 34 is a nonvolatile recording medium on which captured image data, correction information that is required by the conversion information calculation unit 332, intermediate data generated during the course of an operation of each block, and parameters to be referred to in an operation of the image processing unit 33 or the digital camera 300 are recorded.

The storage unit 34 may be any recording medium as long as processing capability permitted in the execution of processing is ensured, reading and writing can be performed at high speed, and the recording medium has large capacity. For example, a flash memory is desirable.

The operation input unit 35 is a user interface, such as a dial, a button, a switch, or a touch panel, that detects an information input or a setting change operation input performed on the digital camera 300. Upon detecting an operation input performed, the operation input unit 35 outputs a corresponding control signal to the control unit 32.

The display unit 36 is a display device such as a liquid crystal display or an organic electroluminescence (EL) display. The display unit 36 is used for checking a composition at the time of image capturing by displaying a live view image of a captured image under the control of the control unit 32, and for presenting various setting screens and message information. Further, by integrally forming a touch panel serving as the operation input unit 35 and a display surface of the display unit 36, a display function and an input function can be provided in combination.

The communication unit 37 is a communication interface that is included in the digital camera 300 to implement information transmission and reception with an external apparatus. The communication unit 37 may be configured to transmit obtained captured images, depth information, dimensions, coordinate information, and dimension measurement accuracy to another apparatus.

<Configuration of Image Sensor>

Next, a configuration example of the above-described image sensor 31 will be described with reference to FIGS. 7A and 7B.

Figure 7A:
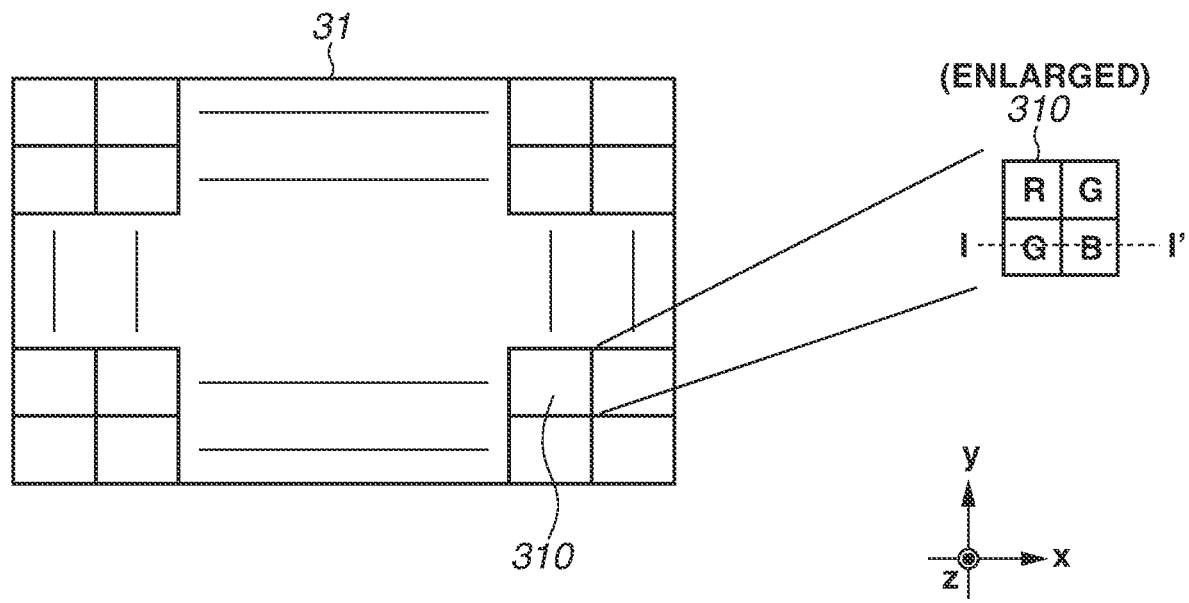
FIG. 7A is a diagram illustrating an image sensor according to the third exemplary embodiment.
Figure 7B:
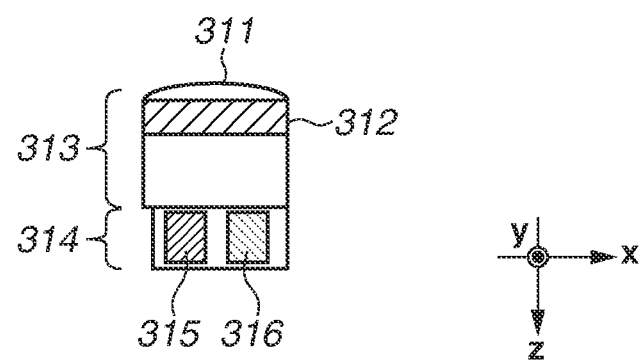
FIG. 7B is a diagram illustrating an image sensor according to the third exemplary embodiment

As illustrated in FIG. 7A, the image sensor 31 includes a plurality of pixel groups 310 arrayed in a linked manner, and each of the pixel groups 310 includes 2×2 pixels to which different color filters are applied. As illustrated in an enlarged view, red (R), green (G), and blue (B) color filters are arranged in the pixel group 310. An image signal indicating color information of any of R, G, and B is output from each pixel (photoelectric conversion element). In the present exemplary embodiment, the description will be given of a configuration in which color filters have a distribution as illustrated in FIG. 7A as an example, but it is to be easily understood that the implementation of the present invention is not limited to this.

For implementing a distance measuring function of an imaging plane phase difference distance measuring method, in the image sensor 31 of the present exemplary embodiment, one pixel (photoelectric conversion element) includes a plurality of photoelectric conversion units arranged in an I-I' cross section in FIG. 7A in the horizontal direction of the image sensor 31. More specifically, as illustrated in FIG. 7B, each pixel includes a light guiding layer 313 including a micro lens 311 and a color filter 312, and a light receiving layer 314 including a first photoelectric conversion unit 315 and a second photoelectric conversion unit 316.

In the light guiding layer 313, the micro lens 311 is configured to efficiently guide light fluxes entering the pixel, to the first photoelectric conversion unit 315 and the second photoelectric conversion unit 316. In addition, the color filter 312 that is for letting through light in a predetermined wavelength band lets through only light in a wavelength band of any of R, G, and B described above, and guides the light to the subsequent first photoelectric conversion unit 315 and the second photoelectric conversion unit 316.

The light receiving layer 314 is provided with two photoelectric conversion units (the first photoelectric conversion unit 315 and the second photoelectric conversion unit 316) that convert received light into an analog image signal, and two types of signals output from these two photoelectric conversion units are used in distance measurement. In other words, each pixel of the image sensor 31 similarly includes two photoelectric conversion units arranged in the horizontal direction, and an image signal composed of signals output from the first photoelectric conversion units 315 of all the pixels, and an image signal composed of signals output from the second photoelectric conversion units 316 are used. In other words, the first photoelectric conversion unit 315 and the second photoelectric conversion unit 316 each partially receive light fluxes entering a pixel via the micro lens 311. For this reason, two types of image signals that are finally obtained become a pupil division image group related to light fluxes having passed through different regions of an exit pupil of the imaging optical system 30. A signal obtained by synthesizing image signals photoelectrically converted by the first photoelectric conversion unit 315 and the second photoelectric conversion unit 316 in each pixel is equivalent to an image signal (for viewing) output from one photoelectric conversion unit in a configuration in which only the one photoelectric conversion unit is included in each pixel.

With such a structure, the image sensor 31 of the present exemplary embodiment can output a viewing image signal and a distance measuring image signal (two types of pupil division images). In the present exemplary embodiment, the description will be given assuming that all pixels of the image sensor 31 each include two photoelectric conversion units, and are configured to output high-density depth information, but implementation of the present invention is not limited to this, and only a part of pixels may include a plurality of photoelectric conversion units. Alternatively, in a configuration in which only one photoelectric conversion unit is provided in each pixel, photoelectric conversion units that receive light fluxes having passed through different regions of an exit pupil may be arranged in a part of the image sensor 31 and in different pixels.

<Distance Measurement Principle of Imaging Plane Phase Difference Distance Measuring Method>

A principle of calculating a subject distance based on a pupil division image group output from the first photoelectric conversion unit 315 and the second photoelectric conversion unit 316 that is performed the digital camera 300 of the present exemplary embodiment will be described with reference to FIGS. 8A and 8B.

Figure 8A:
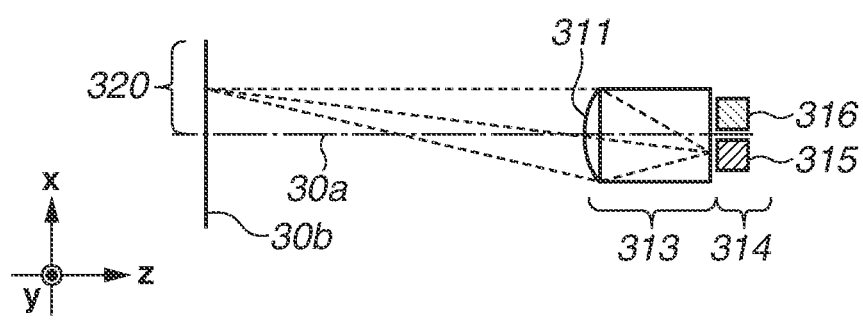
FIG. 8A is a diagram illustrating a distance measurement principle of an imaging plane phase difference method.

FIG. 8A is a schematic diagram illustrating the exit pupil 30b of the imaging optical system 30, and light fluxes to be received by the first photoelectric conversion unit 315 of a pixel in the image sensor 31. FIG. 8B is a schematic diagram illustrating light fluxes to be similarly received by the second photoelectric conversion unit 316.

Figure 8B:
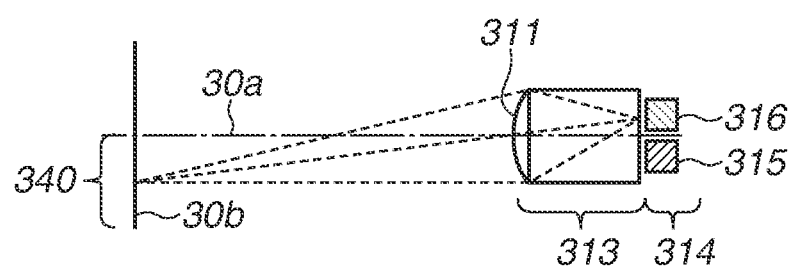
FIG. 8B is a diagram illustrating a distance measurement principle of an imaging plane phase difference method.

The micro lens 311 illustrated in FIGS. 8A and 8B is arranged in such a manner that the exit pupil 30b and the light receiving layer 314 are in an optically conjugate relationship. Light fluxes having passed through the exit pupil 30b of the imaging optical system 30 are condensed by the micro lens 311, and guided to the first photoelectric conversion unit 315 or the second photoelectric conversion unit 316. At this time, the first photoelectric conversion unit 315 and the second photoelectric conversion unit 316 mainly receive light fluxes having passed through different pupil regions as illustrated in FIGS. 8A and 8B, respectively. The first photoelectric conversion unit 315 receives light fluxes having passed through a first pupil region 320, and the second photoelectric conversion unit 316 receives light fluxes having passed through a second pupil region 340.

A plurality of first photoelectric conversion units 315 included in the image sensor 31 mainly receives light fluxes having passed through a first pupil region 320, and outputs a first image signal. Further, at the same time, a plurality of second photoelectric conversion units 316 included in the image sensor 31 mainly receives light fluxes having passed through the second pupil region 340, and outputs a second image signal. From the first image signal, an intensity distribution of an image formed on the image sensor 31 by light fluxes having passed through the first pupil region 320 can be obtained. Further, from the second image signal, an intensity distribution of an image formed on the image sensor 31 by light fluxes having passed through the second pupil region 340 can be obtained.

Figure 8C:
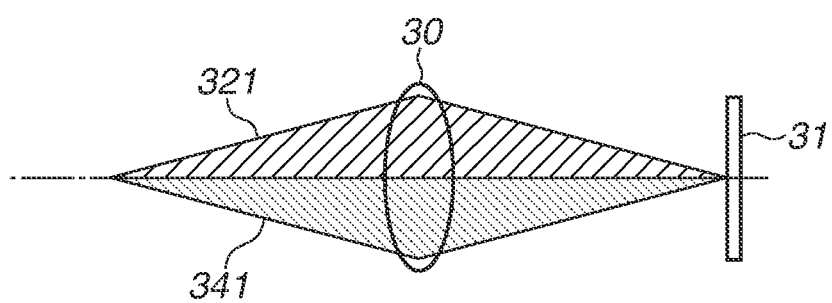
FIG. 8C is a diagram illustrating a distance measurement principle of an imaging plane phase difference method.
Figure 8D:
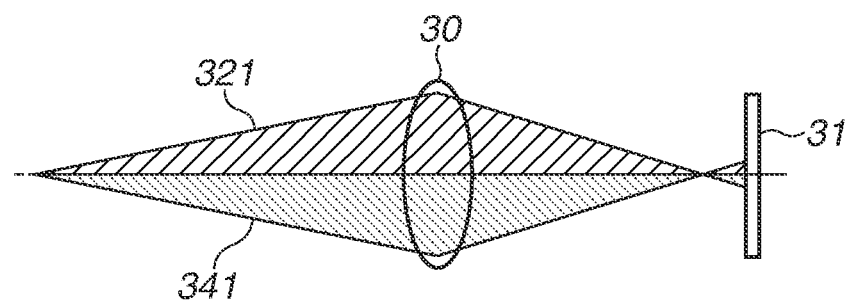
FIG. 8D is a diagram illustrating a distance measurement principle of an imaging plane phase difference method.
Figure 8E:
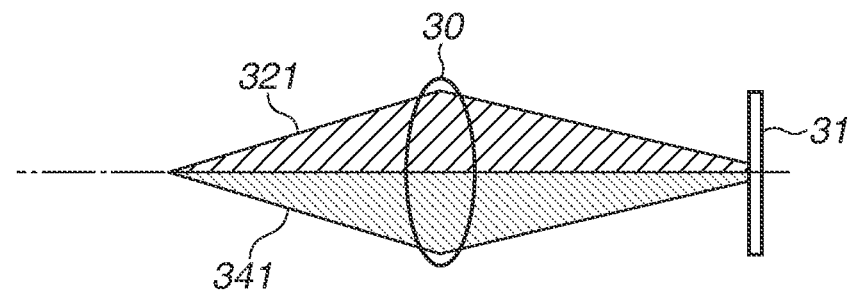
FIG. 8E is a diagram illustrating a distance measurement principle of an imaging plane phase difference method.
Figure 11:
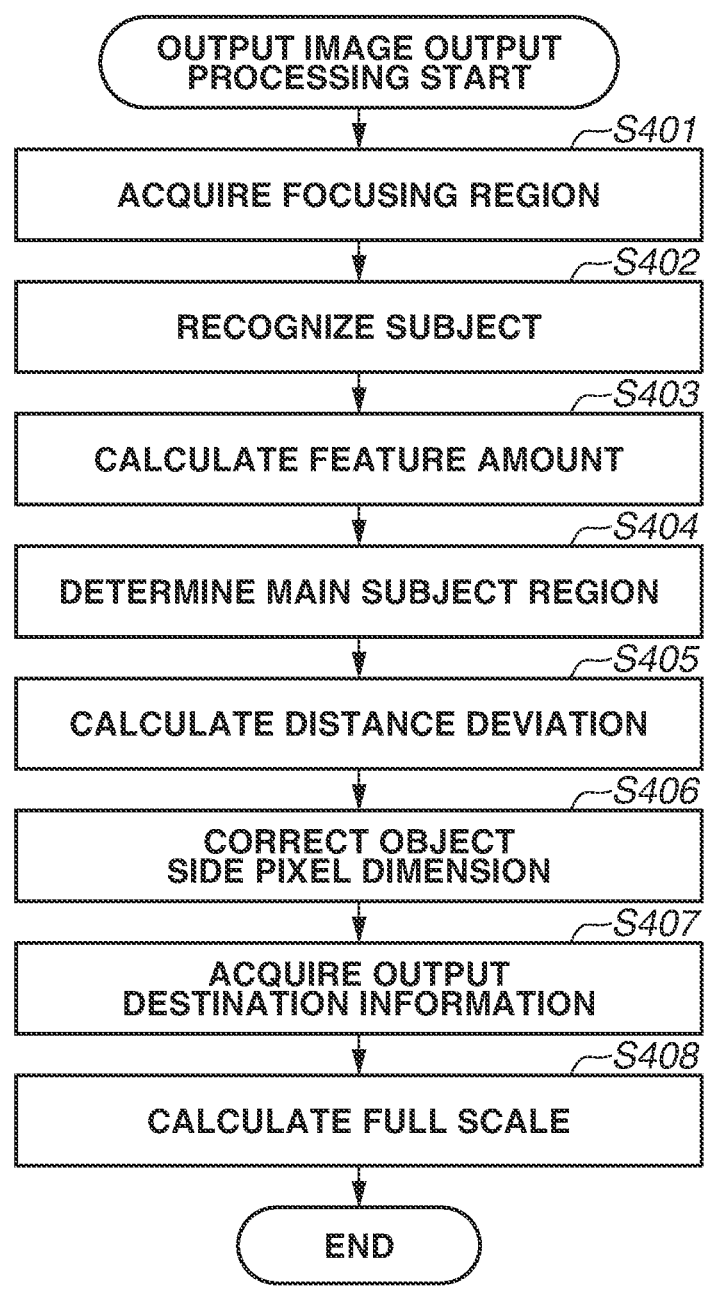
FIG. 11 is a flowchart illustrating processing to be executed in a fourth exemplary embodiment.

A relative positional shift amount (so-called parallax amount) between the first image signal and the second image signal becomes a value corresponding to a defocus amount. A relationship between a parallax amount and a defocus amount will be described with reference to FIGS. 8C, 8D, and 8E. FIGS. 8C, 8D, and 8E are schematic diagrams illustrating the image sensor 31 and the imaging optical system 30 of the present exemplary embodiment. In the drawings, first light fluxes 321 pass through the first pupil region 320 and second light fluxes 341 pass through the second pupil region 340.

FIG. 8C illustrates an in-focus state, and the first light fluxes 321 and the second light fluxes 341 converge on the image sensor 31. At this time, a parallax amount between a first image signal formed by the first light flux 321 and a second image signal formed by the second light flux 341 becomes 0. FIG. 8D illustrates a state in which defocus occurs in a negative direction of a z-axis on an image side. At this time, a parallax amount between a first image signal formed by the first light flux and a second image signal formed by the second light flux does not become 0 and has a negative value. FIG. 8E illustrates a state in which defocus occurs in a positive direction of the z-axis on the image side. At this time, a parallax amount between a first image signal formed by the first light flux and a second image signal formed by the second light flux has a positive value. From the comparison between FIGS. 8D and 8E, it can be seen that a direction of a positional shift switches in accordance with the positive/negative of a defocus amount. Further, it can be seen that, in accordance with a defocus amount, a positional shift occurs in conformity to an image forming relationship (geometric relationship) of an imaging optical system. A parallax amount that is a positional shift between a first image signal and a second image signal can be detected using a region-based matching method to be described below.

<Image Generation and Conversion Information Calculation Processing>

Regarding image generation of an imaged subject and conversion information calculation processing that are to be executed by the digital camera 300 of the present exemplary embodiment having the above-described configuration, specific processes will be described with reference to a flowchart in FIG. 9A.

In step S331, the control unit 32 executes processing in such a manner as to perform image capturing using set image capturing settings such as a focal point position, aperture, and an exposure time. More specifically, the control unit 32 controls the image sensor 31 to perform image capturing and transmit an obtained captured image to the image processing unit 33, and controls the captured image to be stored into a memory. The captured image includes two types of signals that are an image signal S1 composed of signals output from the first photoelectric conversion units 315 included in the image sensor 31, and an image signal S2 composed of signals output from the second photoelectric conversion units 316. Alternatively, two types of signals that are a signal obtained by mixing (adding) signals output from the first photoelectric conversion unit 315 and the second photoelectric conversion unit 316 using, for example, floating diffusion, and a signal (S1 or S2) output from either of the photoelectric conversion units may be output from the image sensor 31.

In step S332, the image processing unit 33 generates a viewing image from the obtained captured image. More specifically, first of all, the image generation unit 330 of the image processing unit 33 generates one Bayer array image by adding pixel values of pixels of the image signal S1 and the image signal S2. The image generation unit 330 generates a viewing image by performing demosaicing processing for RGB color images on the Bayer array image. The demosaicing processing is performed in accordance with color filters arranged on an image sensor, and any method may be used as a demosaicing method. Aside from this, the image generation unit 330 performs processing such as noise removal, luminance signal conversion, aberration correction, white balance adjustment, and color correction, generates a final viewing image, and stores the generated final viewing image into a memory.

In step S333, the image processing unit 33 generates a depth image (depth distribution information) from the obtained captured image. The depth image generation unit 331 performs processing related to the generation of the depth image. Here, the processing related to depth image generation will be described with reference to a flowchart in FIG. 9B.

In step S3331, the depth image generation unit 331 performs light amount correction processing on the image signal S1 and the image signal S2. At a peripheral field angle of the imaging optical system 30, a light amount balance between the image signal S1 and the image signal S2 is disrupted due to vignetting caused by different shapes of the first pupil region 320 and the second pupil region 340. Thus, in this step, the depth image generation unit 331 performs light amount correction of the image signal S1 and the image signal S2 using, for example, a light amount correction value prestored in a memory.

In step S3332, the depth image generation unit 331 performs processing of reducing noise generated in the conversion in the image sensor 31. Specifically, the depth image generation unit 331 realizes noise reduction by applying filter processing to the image signal S1 and the image signal S2. Generally, in a high frequency region in which a space frequency is higher, a signal-to-noise (S/N) ratio is lower and noise components relatively increase. The depth image generation unit 331 accordingly performs processing of applying a lowpass filter by which a passage rate becomes lower as a space frequency is higher. Because a desirable result sometimes cannot be obtained in the light amount correction in step S3331 due to errors in manufacturing of the imaging optical system 30, the depth image generation unit 331 desirably applies a bandpass filter that blocks direct-current components and has a low passage rate of high frequency components.

In step S3333, based on the image signal S1 and the image signal S2 (both signals collectively regarded as a phase difference signal), the depth image generation unit 331 calculates a parallax amount between these images. Specifically, the depth image generation unit 331 sets, in the image signal S1, a target point corresponding to representative pixel information, and a collation region centered on the target point. The collation region may be a rectangular region, such as a square region that is centered on the target point and has a predetermined length on a side. Next, the depth image generation unit 331 sets a reference point in the image signal S2, and sets a reference region centered on the reference point. The reference region has the same size and the shape as the above-described checking region. The depth image generation unit 331 calculates a degree of correlation between an image included in the collation region of the image signal S1 and an image included in the reference region of the image signal S2 while sequentially moving the reference point, and identifies a reference point having the highest correlation degree, as a corresponding point in the image signal S2 that corresponds to the target point. A relative positional shift amount between the corresponding point identified in this manner and the target point is a parallax amount at the target point.

By calculating a parallax amount while sequentially changing a target point in accordance with representative pixel information in this manner, the depth image generation unit 331 calculates parallax amounts at a plurality of pixel positions defined by the representative pixel information. In the present exemplary embodiment, for the sake of simplicity, in order to obtain depth information at the same resolution as that of a viewing image, pixel positions for calculating a parallax amount (pixel groups included in representative pixel information) are to be set in the same number as that of a viewing image. As a calculation method of a correlation degree, a method such as Normalized Cross-Correlation (NCC), Sum of Squared Difference (SSD), or Sum of Absolute Difference (SAD) may be used.

Further, by using a predetermined conversion coefficient, the calculated parallax amount can be converted into a defocus amount which corresponds to a distance from the image sensor 31 to a focal point of the imaging optical system 30. When the predetermined conversion coefficient is denoted by K and a defocus amount is denoted by $\Delta L$, a parallax amount d can be converted into a defocus amount by the following formula:

$$\Delta L = K \times d \qquad \text{Formula (4).}$$

The conversion coefficient K is set for each region based on information including an aperture value, an exit pupil distance, and an image height in the image sensor 31.

The depth image generation unit 331 configures two-dimensional information including a defocus amount calculated in this manner as a pixel value, and stores the two-dimensional information into a memory as a depth image. In addition, the depth image generation unit 331 may store a distribution of parallax amounts in the calculated parallax state into a memory as a depth image. In this case, the depth image is converted into a defocus amount in a case where the depth image is used for dimension calculation in a subsequent step. In other words, the depth distribution information may be any one of distribution information of a parallax amount indicated by a phase difference signal corresponding to the image up to a subject, distribution information of a defocus amount of a subject in an image, and distribution information of a subject distance up to a subject in an image.

In step S334, the conversion information calculation unit 332 performs processing of calculating conversion information for converting a dimension of one pixel in a captured image into a dimension that occupies in a space in a desired subject distance. Here, processing related to measured subject display will be described with reference to a flowchart in FIG. 9C.

In step S3341, information such as a lens name, a focal length, a subject distance, and information regarding an in-focus state is acquired from the control unit 32. The information regarding an in-focus state is, for example, information about a pulse number of a motor that has driven a focusing lens for focusing. Furthermore, distortion aberration information and axial chromatic aberration information that correspond to the lens name are acquired from the storage unit 34. In a case where the imaging optical system 30 embeds another separate storing unit therein, and aberration information is stored in the storage unit, the aberration information may be acquired from the storage unit of the imaging optical system 30 via the control unit 32.

In step S3342, using the acquired image capturing information, in-focus state information, and various types of aberration information, correction of a focal length and a subject distance is executed as described in the first exemplary embodiment.

In step S3343, based on the corrected focal length and the defocus amount calculated in depth image generation processing, a defocus amount $\Delta L$ can be converted into a subject distance by using the following lens formula in geometric optics:

$$1/A + 1/B = 1/F \qquad \text{Formula (5).}$$

In this formula, A denotes a distance (subject distance) from an object surface to a principal point of the imaging optical system 30, B denotes a distance from the principal point of the imaging optical system 30 to an image plane, and F denotes a focal length of the imaging optical system 30. In other words, because a value of the distance B can be calculated from the defocus amount $\Delta L$ in the lens formula, based on the setting of a focal length in image capturing, the distance A from the subject to the imaging optical system 30 can be calculated.

Furthermore, from the distance A and the distance B at each pixel position of a captured image, a magnification m at each pixel that is used at the time of image capturing can be calculated.

In step S3343, by calculating a product of a pixel dimension p of an image sensor used in image capturing, and the magnification m at an arbitrary pixel position, an object side pixel dimension at the arbitrary pixel position can be calculated, and an actual size can be obtained. By calculating magnifications at all pixel positions, object side pixel dimensions (object side pixel dimension images) at all the pixel positions can be obtained. The object side pixel dimension images are stored into the storage unit 34 as conversion information together with a captured image, and the processing is ended. Instead of the object side pixel dimension images, magnification information (magnification information images) at all pixel positions can also be stored into the storage unit 34 as conversion information together with a captured image.

In a case where the digital camera 300 is used, conversion information can be calculated in a plurality of regions, and a conversion information image in which conversion information is calculated over all pixels and stored as pixel values can be obtained as described above. Nevertheless, in a case where the capacity of a captured image is desired to be saved, there is no need to always store a conversion information image, and a conversion information image having the number of pixels smaller than the number of pixels of a captured image by reduction or thinning may be stored. Alternatively, only conversion information at one point or a plurality of in-focus regions can be stored. Furthermore, object detection such as face detection may be executed, and a representative value (for example, average value) of conversion information in a detected object region can also be stored.

In the present exemplary embodiment, the description has been given assuming that the image sensor 31 includes a photoelectric conversion element of the imaging plane phase difference distance measuring method, and can acquire a viewing image and a depth image, but in the implementation of the present invention, acquisition of distance information is not limited to this. For example, distance information may be acquired using a stereo distance measuring method based on a plurality of captured images obtained from a binocular imaging apparatus or a plurality of different imaging apparatuses. Alternatively, for example, distance information may be acquired using a stereo distance measuring method that uses a light emission unit and an imaging apparatus, or a method that combines a Time of Flight (TOF) method and an imaging apparatus.

<Output Apparatus>

Subsequently, a configuration in which output image generation processing and relative image generation processing are embedded in an output device such as a printing apparatus or a display device will be described with reference to FIGS. 10A and 10B. FIG. 10A is a block diagram illustrating a functional configuration of a display device 301 in which output image generation processing and relative image generation processing are embedded. Further, FIG. 10B is a block diagram illustrating a functional configuration of a printing apparatus 302 in which output image generation processing and relative image generation processing are embedded.

The display device 301 or the printing apparatus 302 acquires a captured image and object side pixel dimension information from the digital camera 300 via the input unit 11, and transmits the captured image and the object side pixel dimension information to an image processing unit 33'. The image processing unit 33' includes an output image generation unit 333 and a relative image generation unit 334, and either processing is selected and executed. The processing to be executed by the output image generation unit 333 and the relative image generation unit 334 is similar to the output image generation processing and the relative image generation processing that have been described in the first and second exemplary embodiments. In the case of the display device 301, the generated output image or relative image is transmitted to the display unit 36 and displayed thereon, and in the case of the printing apparatus 302, the generated output image or relative image is transmitted to a printing unit 39 and printed. The generated output image or relative image can be stored into the storage unit 34, and can also be transmitted to the outside via the communication unit 37.

As described above, according to the image processing apparatus of the present exemplary embodiment, a highly-accurate object side pixel dimension can be calculated in an imaging apparatus, and information regarding an in-focus state of the imaging apparatus and the like needs not be transmitted to the outside. On the other hand, the display device and the printing apparatus also need not store correction information for calculating a highly-accurate object side pixel dimension from image capturing information.

Further, by embedding the processing in an imaging apparatus that can perform imaging plane phase difference distance measurement, it becomes possible to generate an output image of an arbitrary subject other than an in-focus subject that has been converted in such a manner as to be in full scale in an output on an output destination device.

Modified Example of Third Exemplary Embodiment

In the present exemplary embodiment, the description has been given assuming that the image sensor 31 outputs a phase difference signal, includes a photoelectric conversion element in such a manner that imaging plane phase difference distance measurement can be performed, and can acquire a depth image (depth distribution information) in a plurality of regions of a captured image. Nevertheless, the configuration is not limited to this, and the conversion information calculation processing can also be embedded in a digital camera that calculates a subject distance for one in-focus region or a digital camera that calculates subject distances for a plurality of in-focus regions. In a case where a subject distance calculable in this manner is only for one point, it is desirable to obtain the number of pixels per unit length from calculated object side pixel dimension information, and write the obtained number of pixels into information in the Exif format. A flow of the processing will be described with reference to a flowchart in FIG. 9D.

The processes in steps S3341 to S3343 are processes similar to the processes in steps S1221 to S1223 of the first exemplary embodiment, but differ in that the processes are executed in a digital camera.

In step S3344, the number of pixels per unit length is calculated using the calculated object side pixel dimension, and recorded as resolution information in the Exif format. One mm may be used as a unit length, but one inch may be used in a case where printing is considered, and the calculated number of pixels per unit length may be recorded as pixels per inch (PPI) information.

Further, as described in the third exemplary embodiment, the number of pixels per unit length can also be calculated for each region detected in object detection processing such as face detection, in addition to an in-focus region, and recorded.

By recording the number of pixels per unit length as attribute information of a captured image in association with a corresponding image, an advantage is produced in that output image generation processing needs not be provided in a printing apparatus. This is because a normal printing apparatus has a function of reading PPI information and executing printing in accordance with the information.

As described above, according to the image processing apparatus of the modified example of the present exemplary embodiment, it becomes possible to acquire highly-accurate object side pixel dimension information from a captured image without varying the capacity of image capturing information in the conventional Exif format.

Fourth Exemplary Embodiment

Next, a fourth exemplary embodiment of the present invention will be described. In the first and second exemplary embodiments, a position on a captured image at which an object side pixel dimension can be calculated is limited to an in-focus region. In a case where an in-focus region is different from a desired subject position and in a case where a desired subject exists in a distance different from the in-focus region and a subject, an actual size of the desired subject cannot be correctly acquired. In view of the foregoing, in the present exemplary embodiment, a full-scale image is generated by correcting an object side pixel dimension calculated in a case where an in-focus position and a desired subject distance are different.

Figure 12A:
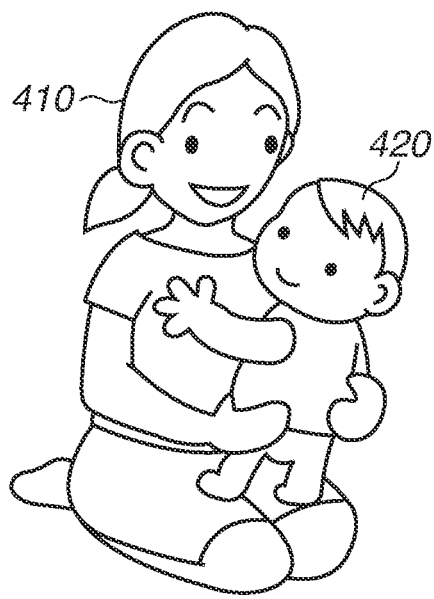
FIG. 12A is a diagram illustrating processing to be executed in the fourth exemplary embodiment.

Output image generation processing according to the present exemplary embodiment for generating an output image converted in such a manner that a subject is in full scale in an output on an output destination device will be described with reference to a flowchart in FIG. 11 and FIGS. 12A to 12C. FIG. 12A illustrates a captured image input to generate an output image. Further in this example, the description will be given of a case where an in-focus position is located at the left eye of a person 410, and an output image of a person 420 is generated. Similarly to other flows, processing corresponding to the flowchart is implemented by the control unit 16 or each component operating by the control unit 16 reading out a corresponding processing program stored in a nonvolatile memory in the control unit 16, loading the processing program onto a volatile memory in the control unit 16, and executing the processing program, for example.

Figure 12B:
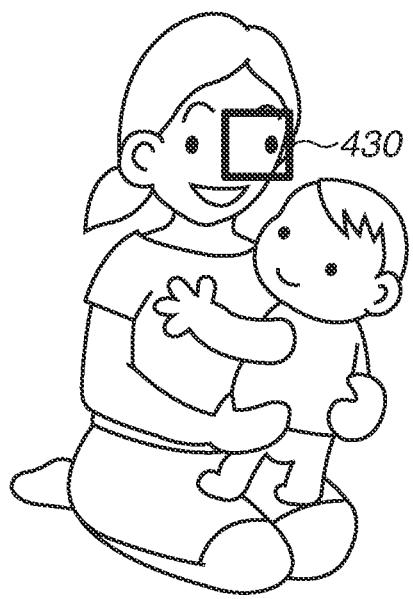
FIG. 12B is a diagram illustrating processing to be executed in the fourth exemplary embodiment.

In step S401, an in-focus region in a captured image is acquired from the captured image. The in-focus region may be estimated by analyzing the captured image and performing edge extraction, for example. Alternatively, an in-focus region frame (coordinate information indicating an in-focus region frame) set at the time of image capturing may be recorded in the Exif format and read out. FIG. 12B illustrates the acquired in-focus region as an in-focus region 430.

Figure 12C:
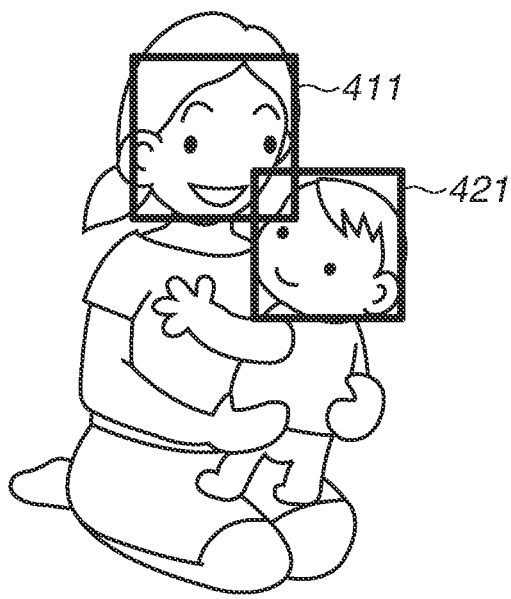
FIG. 12C is a diagram illustrating processing to be executed in the fourth exemplary embodiment.

In step S402, the image generation unit executes subject recognition on the captured image. As an example, a case of face detection will be described. By face detection processing, a face frame 411 of the person 410 and a main subject region 421 of the person 420 are detected as illustrated in FIG. 12C.

In step S403, feature amounts such as age and gender are calculated from images of the detected face regions.

In step S404, by comparing the calculated feature amounts in accordance with a prepared rule, a main subject is determined among detected faces. For example, a rule for determining a subject with a younger estimated age as a main subject is defined. In this case, the person 420 is determined as a main subject.

In step S405, a subject distance deviation between the in-focus region 430 and the main subject region 421 is calculated. In the case of a digital camera that can acquire depth information as described in the third exemplary embodiment, a subject deviation can be easily calculated. On the other hand, because depth information cannot be acquired in the case of the first and second exemplary embodiments, a difference in distance is estimated from contrasts or blurring amounts of images of the in-focus region 430 and the main subject region 421.

In step S406, an object side pixel dimension is corrected using the calculated difference in distance, a subject distance of an in-focus region that has been calculated in the conversion information calculation processing, and a focal length, and an object side pixel dimension in a subject distance of the main subject region 421 is calculated.

In step S407, output destination information is acquired, and then in step S408, an output image converted in such a manner that the main subject region 421 is in full scale in an output on an output destination device of the main subject region 421 is generated.

The description has been given of an example case where a subject existing at a position different from an in-focus position is automatically obtained here, but the user may directly designate a main subject in steps S404 without executing steps S402 and S403.

As described above, according to the image processing apparatus of the present exemplary embodiment, it becomes possible to generate an output image converted in such a manner that a subject existing in a region other than an in-focus region is in full scale in an output on an output destination device. [Modified Example of Fourth Exemplary Embodiment]

In the present exemplary embodiment, the description has been given of a case where the determination of a subject for which image conversion is performed in such a manner that the subject is in full scale in an output on an output destination device (steps S401 to S406) is executed in the course of the output image generation processing. Nevertheless, the determination of a subject for which image conversion is performed in such a manner that the subject is in full scale in an output on an output destination device (steps S401 to S406) can also be executed within the imaging apparatus described in the third exemplary embodiment. An object side pixel dimension or the number of pixels per unit length in a main subject that is obtained as a result of the execution is recorded as attribute information of a captured image in association with a corresponding image. With this configuration, in the display device and the printing apparatus described in the third exemplary embodiment, an output image converted in such a manner that a main subject is in full scale in an output on an output destination device, or a relative image that enables relative comparison according to actual sizes can be generated.

Further, in a case where a plurality of subjects exists as illustrated in FIGS. 12A to 12C, an object side pixel dimension or the number of pixels per unit length in each subject region may be added as attribute information of a captured image. In this case, a priority order may be set in accordance with a rule as described in step S404, and an object side pixel dimension or the number of pixels per unit length in each subject region may be added as attribute information of a captured image.

Fifth Exemplary Embodiment

Next, a fifth exemplary embodiment of the present invention will be described. In the above-described exemplary embodiments, the description has been given of a case where a highly-accurately calculated object side pixel dimension is applied to full-scale image generation and relative image generation. In the present exemplary embodiment, notification of dimension measurement will be described as different application of an object side pixel dimension.

Figure 13:
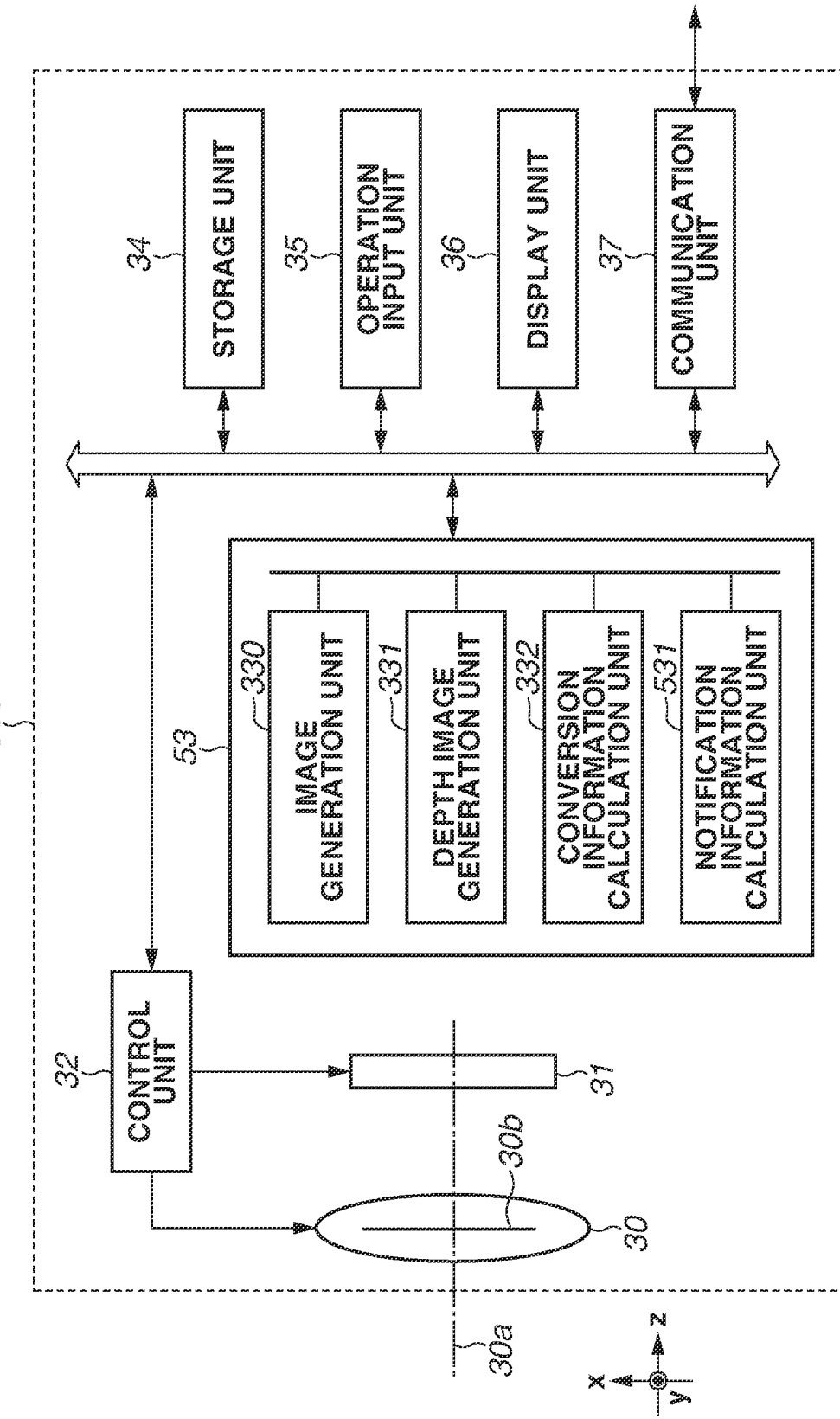
FIG. 13 is a block diagram illustrating a functional configuration of an imaging apparatus according to the fifth exemplary embodiment.

A configuration of a digital camera 500 will be described with reference to FIG. 13. FIG. 13 is a block diagram illustrating a functional configuration of the digital camera 500 in which notification information calculation processing is embedded. Because the configuration other than an image processing unit 53 illustrated in FIG. 13 is similar to that of the digital camera 300 described in the third exemplary embodiment, the description will be omitted.

Figure 14A:
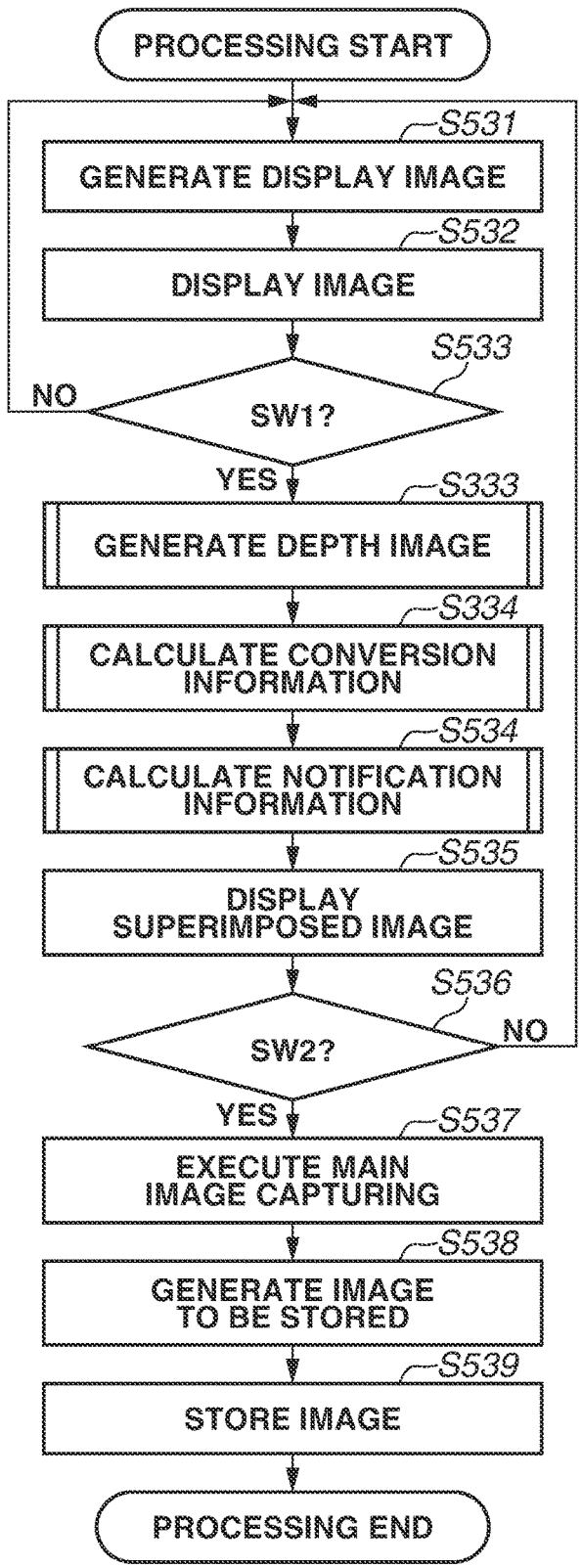
FIG. 14A is a flowchart illustrating processing to be executed in the fifth exemplary embodiment.

Regarding notification information calculation processing for calculating notification information for notifying dimension information regarding a subject dimension at the time of image capturing which is executed by the digital camera 500 of the present exemplary embodiment having such a configuration, specific processes will be described with reference to a flowchart in FIG. 14A. This flow is executed by the control unit 32 or each component under the instruction of the control unit 32.

The processing is started upon the start of image capturing, and in step S531, a display image for displaying a subject imaged by a digital camera, on a display unit is generated. A display image to be generated is an image reduced in accordance with the resolution of the display unit.

In step S532, the control unit 32 displays the generated display image on the display unit. In step S533, it is checked whether a shutter button has been pressed up to the first level for focusing (SW1). In a case where the SW1 has not been pressed, the processing returns to S531, and similar processing is continued.

In a case where the SW1 has been pressed, depth image generation in step S333 is executed as described in the third exemplary embodiment, and further in step S344, conversion information calculation is executed. Here, the number of pixels of a depth image needs not be the number of pixels equivalent to that of an image sensor, and may be the number of pixels equivalent to that of a display image. It is desirable to reduce calculation load of depth image generation processing by reducing the number of pixels of a depth image to be generated.

Figure 14B:
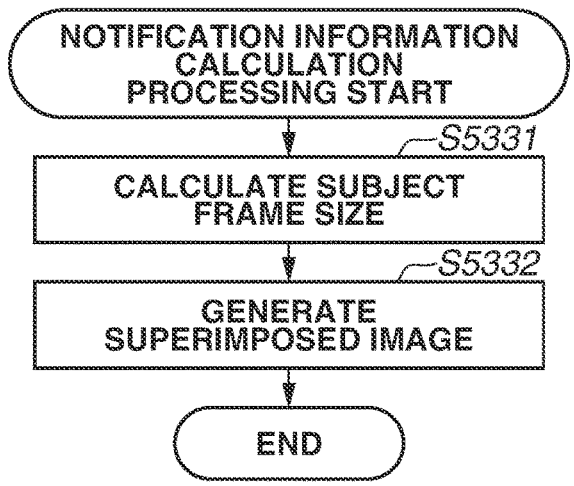
FIG. 14B is a flowchart illustrating processing to be executed in the fifth exemplary embodiment.

In step S534, the control unit 32 executes of calculation of notification information for notifying an image capturing mode in which dimension measurement is executable, by being displayed on a display image. The notification information calculation processing will be described with reference to a flowchart in FIG. 14B.

In step S5331, the control unit 32 acquires the number of pixels of a region on which focusing processing has been executed. Herein, the description will be given of an example case where an in-focus region is rectangular, but the in-focus region is not limited to a rectangle. The in-focus region may have any shape as long as it is a graphical user interface (GUI) for indicating a region in an image. To acquire the number of pixels of the in-focus region, first of all, information regarding a rectangular region used in focusing is acquired from the control unit, and a length of at least one of a long side and a short side is converted into the number of pixels in a display image. By adding the object side pixel dimension, which is conversion information calculated in step S334, to the acquired number of pixels of the side, a dimension of the side of a focus frame in an in-focus subject distance is calculated. The rectangular focus frame and a dimension of a side thereof are to be notification information.

Figure 15A:
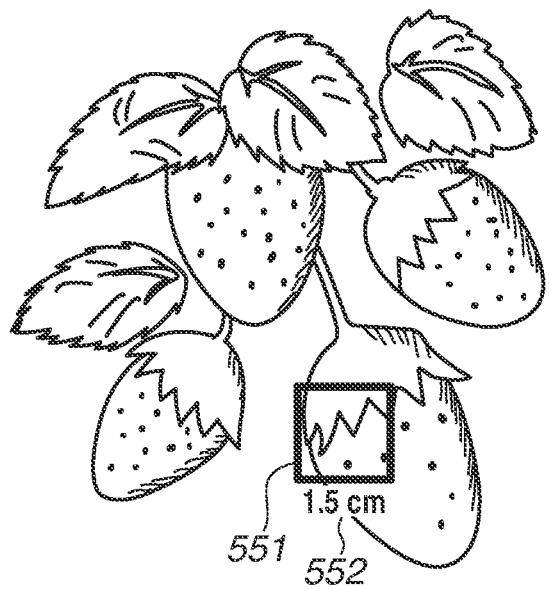
FIG. 15A is a diagram illustrating a notification method according to the fifth exemplary embodiment.

In step S5332, the control unit 32 superimposes the calculated notification information onto the display image, and generates a superimposed image for notification. As illustrated in FIG. 15A, a frame 551 of an in-focus region is displayed in a predefined color in a superimposed manner, and a calculated object side dimension 552 of the rectangle is displayed in a superimposed manner near the side of the rectangle. In the display of an object side dimension, as illustrated in FIG. 15A, it is desirable to display the dimension in a superimposed manner only near one side of the two sides in the horizontal direction among the sides in the horizontal direction and the vertical direction.

In this example, the processing of the depth image generation unit 331 is executed because the description has been given based on a digital camera equipped with the image sensor 31 that can perform imaging plane phase difference distance measurement as described in the third exemplary embodiment; however, the exemplary embodiment can also be applied to a digital camera not supporting the imaging plane phase difference distance measuring method. In a case of a digital camera not supporting the imaging plane phase difference distance measuring method, an object side dimension of a focus frame can be calculated and displayed using subject distance information of an in-focus region.

Figure 15B:
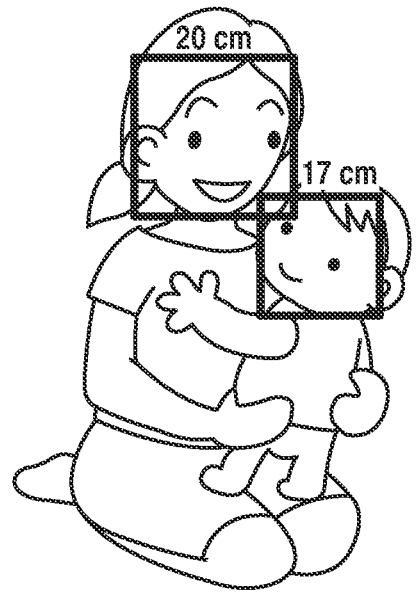
FIG. 15B is a diagram illustrating a notification method according to the fifth exemplary embodiment.

On the other hand, in a case where a sensor that can perform distance measurement of a plurality of regions is used as in the digital camera 500 supporting the imaging plane phase difference distance measuring method as described in the present exemplary embodiment, an object side dimension of a region other than a frame of an in-focus region can also be calculated. For example, as illustrated in FIG. 15B, a case where a plurality of persons exists as subjects in a screen, and their subject distances are different will be described. In this case, a plurality of face detection frames can be acquired by face detection, and by using depth information, object side pixel dimensions can be individually calculated even if their subject distances are different. By adding the number of pixels of a side of a calculated face frame and a corresponding object side pixel dimension, an object side dimension of each face frame can be calculated, and superimposed display of notification information can be performed as illustrated in FIG. 15B.

Figure 15C:
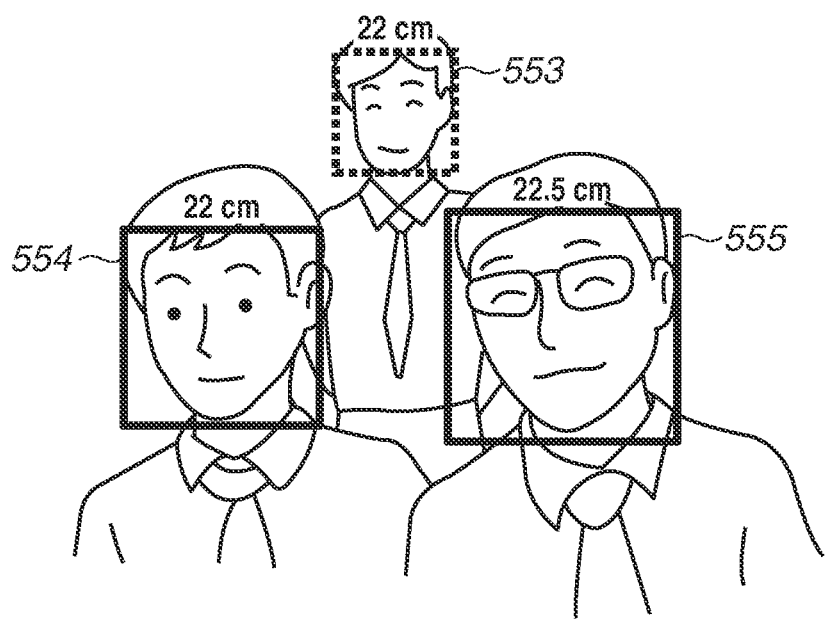
FIG. 15C is a diagram illustrating a notification method according to the fifth exemplary embodiment.

Furthermore, in a case where a plurality of subjects exists in a screen as illustrated in FIG. 15C, it is effective to display rectangular frames in different colors depending on subject distances. FIG. 15C illustrates that a display color of a face frame 553 is different from a display color of a face frame 554 and a face frame 555.

As described above, according to the image processing apparatus of the present exemplary embodiment, because an object side pixel dimension can be calculated by the conversion information calculation processing, it becomes possible to notify a photographer of a subject dimension at the time of image capturing, or notify that image capturing that enables acquisition of dimension information is being executed.

Sixth Exemplary Embodiment

Next, a sixth exemplary embodiment of the present invention will be described. In the first exemplary embodiment, a case where display and printing of a full-scale image are performed has been described, and in the second exemplary embodiment, a case where generation and output of a plurality of images and a relative size comparative image of subjects in the images are performed has been described. In the present exemplary embodiment, an image composition application that uses object side pixel dimension information will be described. As an example the description will be given of a case where face detection is performed on a single image or a plurality of images, face images appearing to have different sizes are extracted in consideration of relative sizes by using object side pixel dimension information, and image composition is performed. Further, the description will be given assuming faces as targets in the present exemplary embodiment, but the same applies to general objects.

Figure 16:
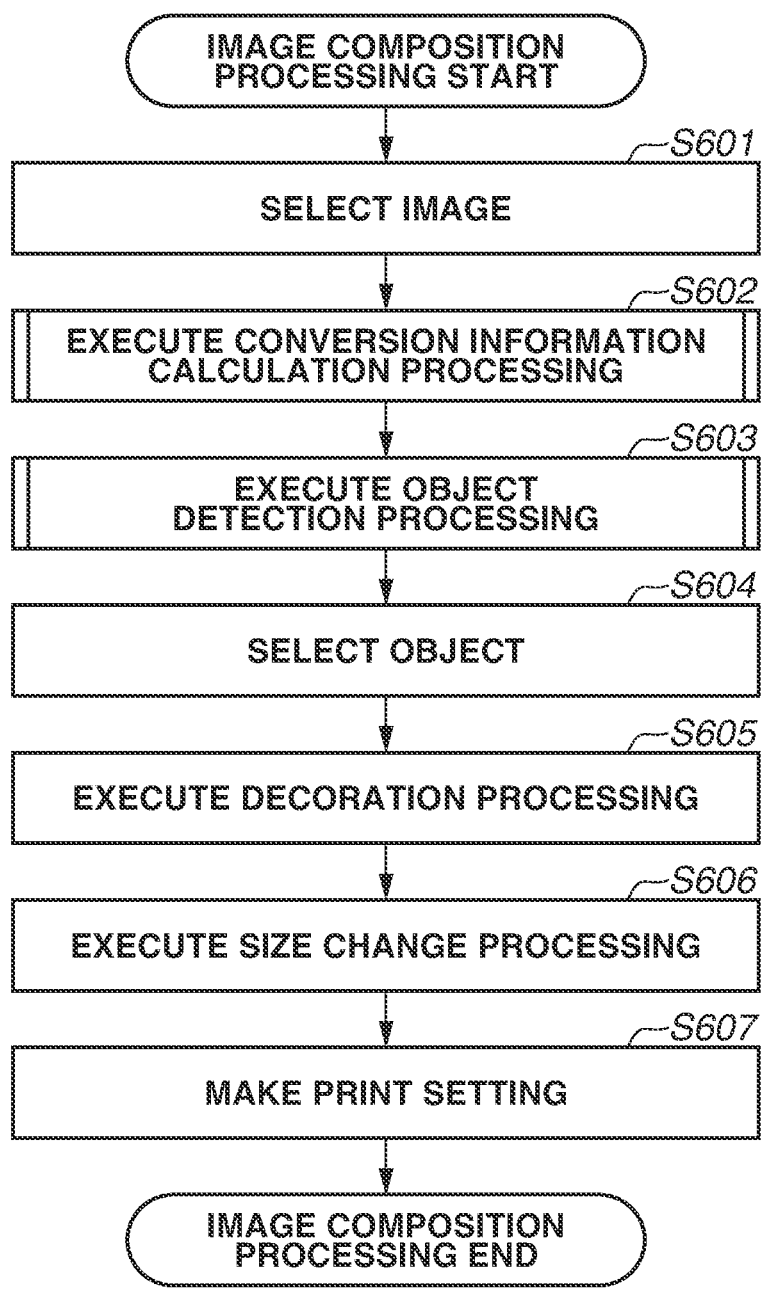
FIG. 16 is a flowchart illustrating processing to be executed in a sixth exemplary embodiment.

Regarding an image composition application that is to be executed in the present exemplary embodiment, specific processes will be described with reference to a flowchart in FIG. 16. This composition application is operable by the control unit 16 (FIGS. 1 and 3), the control unit 32 (FIGS. 6 and 13), a control unit 41 (FIG. 10A), or a control unit 42 (FIG. 10B) in the above-described exemplary embodiments. Hereinafter, the processing will be described below as processing to be executed by the control unit 16 as an example.

Similarly to the other flows, processing corresponding to the flowchart is implemented by the control unit 16 or each component operating by the control unit 16 reading out a corresponding processing program stored in a nonvolatile memory in the control unit 16, loading the processing program onto a volatile memory in the control unit 16, and executing the processing program, for example.

In step S601, the control unit 16 receives the selection of an image including subjects on which composition is to be executed, in accordance with an operation input issued by the user via the operation input unit 17. At this time, candidates of images including subjects on which composition is to be executed may be displayed on the display 2 in a selectable manner using a method such as list display or sequential display.

In step S602, the control unit 16 or the image processing unit 22 executes processing similar to that in step S222 on the selected image, and calculates an object side pixel dimension. In a case where an image not including information for calculating an object side pixel dimension is selected, the processing is stopped. Alternatively, information indicating that object side pixel dimension information has not been calculated is stored, and the processing proceeds to the next process.

In step S603, face detection processing is executed on the selected image, and coordinate information about a face region is output. The coordinate information is information designating a rectangular region from which a face has been detected and is information such as an upper left vertex coordinate and a lower right vertex coordinate of a rectangle, or an upper left vertex coordinate and the width and the height of a rectangle. In a case where a plurality of faces has been detected in one image, similar information is output for each of the plurality of faces. Furthermore, using the output coordinate information of a face region, a coordinate of the center of a head portion is estimated.

In the estimation of the coordinate of the center of a head portion, face organ detection is further executed, and a position such as a position between the eyebrows is detected. A position to be detected as the center of a head depends on each application.

Next, a circle region having a radius R [mm] that is designated based on the head center position, as the origin, calculated based on the object side pixel dimension calculated in step S602, or a rectangular region circumscribed around the circle is clipped from the image selected as a composition target. As a range to be clipped here, the user can designate a desired range, but for saving the user's labor for setting, it is desirable to preset a clipped range suitable for each detected object. A clipped shape is not limited to a circle or a rectangle, and may be another arbitrary shape. For example, clipping may be executed along a region determined in accordance with an outline of a detected subject.

In a case where an image file in which the selected image is recorded does not include metadata necessary for calculating object side pixel dimension information, and regarding an image for which calculation of object side pixel dimension information has failed, a physical size of a rectangular region from which a face has been detected by assuming the size of a face of a general person is estimated. From the estimated physical size of the rectangular region and the number of pixels of one side of the rectangle, an object side pixel dimension is estimated. In this case, a difference in size among individual faces is not considered, and face sizes are uniformized to the size assumed as the general face size. To alleviate this problem, it is desirable to estimate age and gender at the time of face detection, and set a general face size depending on the estimated age and gender. It is also possible to execute face organ detection in a detected face region, and estimate the size of a face from position information about face organs such as an interval between the eye ball centers. The face part detection also enables estimation of the orientation of a face, and by estimating the size of a face considering a change in the interval between the eye ball centers depending on the orientation of the face, it becomes possible to estimate the size of the face more accurately than in a case where there is no object side pixel dimension information.

In this case, an error in clipped range with respect to a designated size depends on a detection result of a rectangular region size in face detection, and a region clipping with a correct size cannot be executed. In a case where calculation of object side pixel dimension information has failed, it is desirable to add information to metadata of an image file including a clipped image, in such a manner that it is recognizable that the clipped region is inaccurate.

Figure 17A:
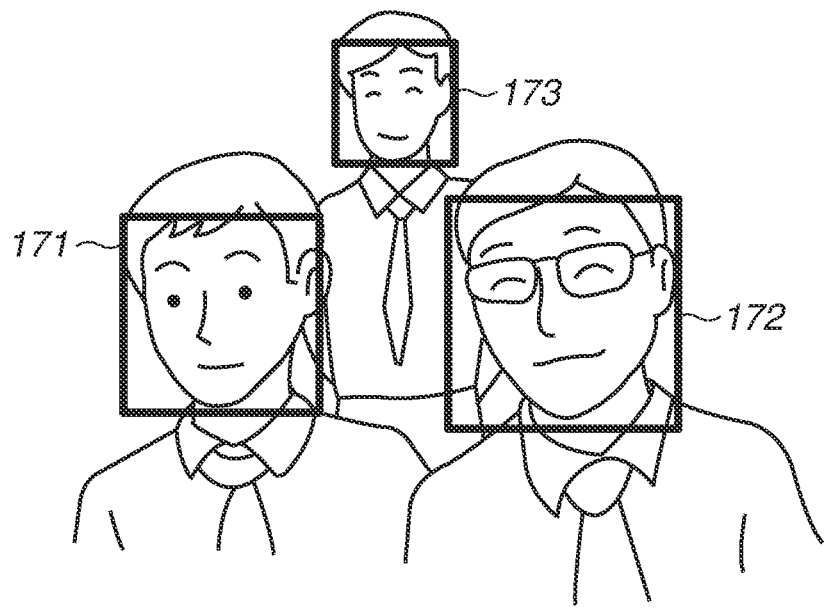
FIG. 17A is a diagram illustrating a display screen to be displayed in processing to be executed in the sixth exemplary embodiment.

Next, a case where subject distance information is stored only for one point of a focus position in calculation of an object side pixel dimension, and a plurality of persons appears in an image will be described. A problem does not occur in a case where all the persons exist in the same distance as the focus position, but in a case where persons exist in different distances from an imaging apparatus as illustrated in FIG. 17A, the sizes of the persons vary even if the persons have the same size. Because an object side pixel dimension can be calculated only at the focus position as described above, individual distances are not considered, and the face of a person appearing on the front side is clipped in a larger size and the face of a person appearing in the distance is clipped in a smaller size.

Figure 17B:
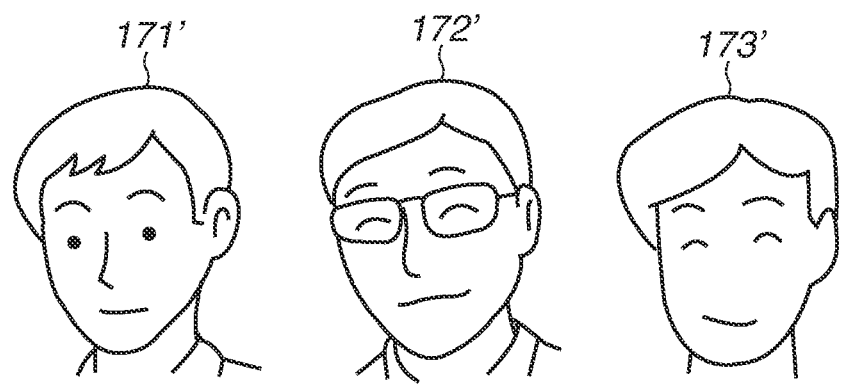
FIG. 17B is a diagram illustrating a display screen to be displayed in processing to be executed in the sixth exemplary embodiment.

To avoid this problem, with reference to a rectangular region size in a result of face detection on a person appearing at the focus position, a ratio of a rectangular region size in a result of face detection on another person is calculated. Based on the ratio, an object side pixel dimension appropriate for the distance of each person is estimated, and based on the estimated object side pixel dimension, a clipped range is calculated. A result is obtained as illustrated in FIG. 17B. In this case, an error in clipped range with respect to a designated size depends on a detection result of a rectangular region size in face detection.

In a case where a face appears in a captured image but the face does not exist at the focus position, similarly to an image for which calculation of object side pixel dimension information has failed, it is possible to prevent a large variation in a clipped range of a face region by assuming a general face size of a person. The determination as to whether a face coincides with a focus position is performed by storing a coordinate of a region in which focusing is performed, as metadata, and determining whether a face detection position coincides with the focus region on a screen (XY-plane). Further, an amount by which a rectangular region detected in face detection changes at the time of clipping is checked, and in a case where the change amount is large, it can be determined that the face is not in focus at the time of image capturing and a focus shift occurs. Information regarding the focus shift is added, and object side pixel dimension information estimated from the size of a general face is further added as described above.

It is desirable to add information in such a manner that a subject for which an object side pixel dimension has been calculated and clipping has been executed, and a subject for which clipping has been executed without using an object side pixel dimension are discriminable. Further, it is desirable to enable the user to recognize whether a clipped image is an image clipped by calculating an object side pixel dimension, when image composition to be described below is performed. These pieces of information are stored in association with a clipped image.

In a case where the resolution of a detected face image is small, if a region with the same size is clipped, enlargement processing of the image becomes necessary and image quality declines. To avoid this problem, it is necessary to set the lowest resolution in face detection processing. Because the lowest resolution depends on a print size, it is determined whether a required resolution is finally satisfied in a print setting to be described below.

Figure 18A:
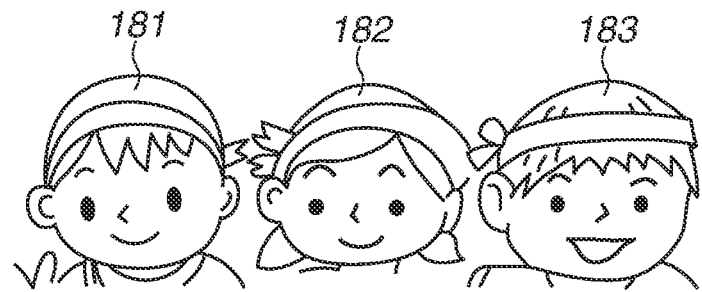
FIG. 18A is a diagram illustrating a display screen to be displayed in processing to be executed in the sixth exemplary embodiment.

In step S604, the user selects a desired face region image from among the clipped face region images, and arranges the selected face region image at a desired position in a separately-prepared work image region. A plurality of faces can be selected and arranged from the same image, and in a case where a face from another image is desired to be arranged, the processes in steps S601 to S604 are repeated. FIG. 18A illustrates an example where faces of three children are selected, arranged and displayed on the display 2.

In a case where an image that significantly reduces the resolution as compared with other face region images is selected in face region image selection, the control unit 16 may notify the user by issuing a warning. For example, as illustrated in FIG. 17A, a detected face 173 is in a distance deviating from a focus position, and appears small. In a case where the face 173 is clipped in such a manner as to have the same size as illustrated in FIG. 17B, because a face 173' is enlarged, the image deteriorates.

Figure 18B:
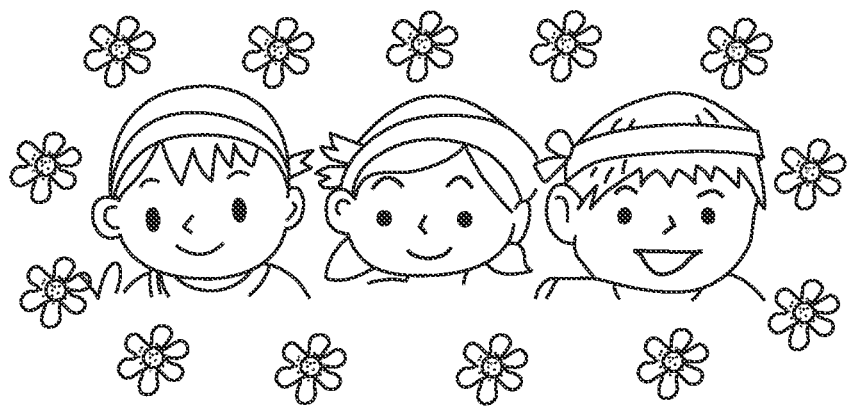
FIG. 18B is a diagram illustrating a display screen to be displayed in processing to be executed in the sixth exemplary embodiment.

In step S605, the control unit 16 receives an operation of arranging a composite object other than a face in a work region, from the user via the operation input unit 17. The composite object is an object decorating a composite image that is a final product, and may be an image, an icon, an illustration, or a character. The user may perform an operation of preliminarily arranging each composite object in a work region before face composition, or can also perform arrangement during the face composition. FIG. 18B illustrates an example in which decoration has been performed by arranging flower illustrations around the faces of the three children arranged in FIG. 18A.

Figure 18C:
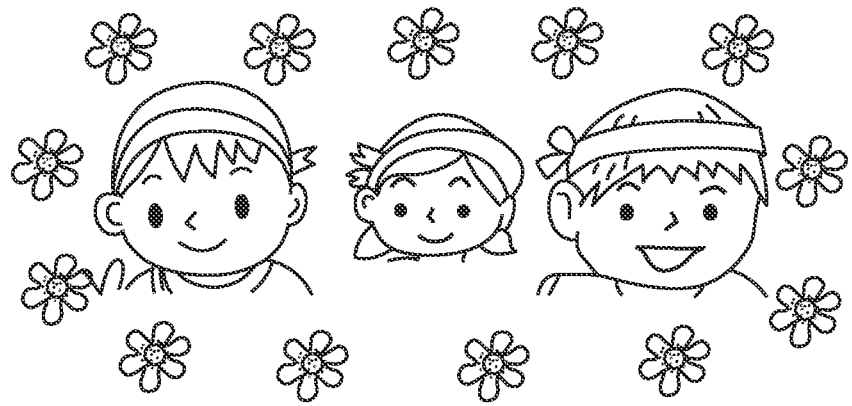
FIG. 18C is a diagram illustrating a display screen to be displayed in processing to be executed in the sixth exemplary embodiment.
Figure 18D:
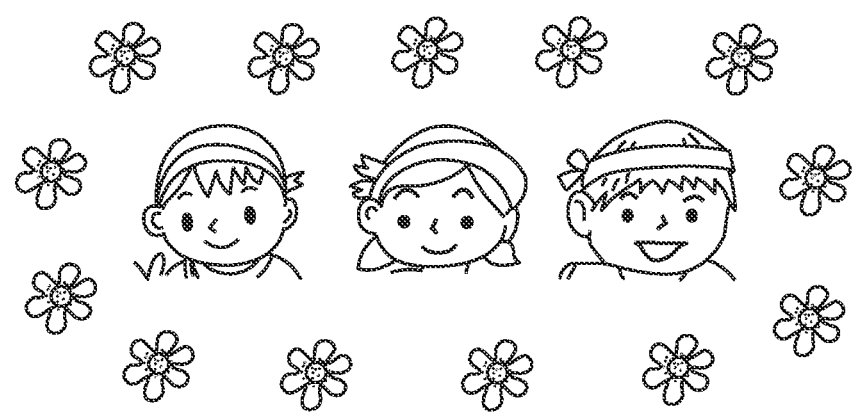
FIG. 18D is a diagram illustrating a display screen to be displayed in processing to be executed in the sixth exemplary embodiment.

In step S606, the control unit 16 receives an operation of changing the size of the arranged composite object, from the user, via the operation input unit 17. The user can individually select each composite object and change the size. Because physical sizes of clipped regions of combined faces are the same, it is desirable to make the sizes of the combined faces simultaneously changeable. Thus, in the present exemplary embodiment, upon reception of an operation of changing the size of one selected face, the control unit 16 issues an instruction to change the sizes of other combined faces by the same amount in an interlocked manner, to the image processing unit 22. The image processing unit 22 performs the same enlargement or reduction processing on a plurality of images preset to be interlocked, and the control unit 16 displays a plurality of images as a processing result, on the display 2. FIG. 18C illustrates a case where the sizes are to be changed with reference to a face 182 at the center. If the size of the face 182 is reduced as illustrated in FIG. 18C, sizes of other faces 181 and 183 are changed in an interlocked manner as illustrated in FIG. 18D. This is an example case where only the sizes of faces other than flowers serving as a decorative object are changed in an interlocked manner. In a case where a decorated image also holds an object side pixel dimension, a size change can also be performed while maintaining a relative size with a face. The size of a composite object other than a face that holds an object side pixel dimension can be changed in an interlocked manner. Further, by separating a storage region for storing a composite image to be subjected to size adjustment from a storage region for storing decorative images, it is also possible to identify a region from which the image has been selected. In a case where the size of a decorative object is also desired to be changed in an interlocked manner, by the user making an interlock setting, the size can be changed in an interlocked manner.

In step S607, the control unit 16 receives an instruction of a print setting from the user via the operation input unit 17. In the print setting, a sheet size to be printed and a desired printed size (desired output size) are set. By fixing a print sheet size to a general A4 or A3 size, and setting only a size in which printing is desired to be executed, a print setting can be easily executed. Further, full scale printing is made designatable, and a printing size and divided printing are automatically calculated using an object side pixel dimension in such a manner that a combined main subject becomes in an actual size.

Figure 19A:
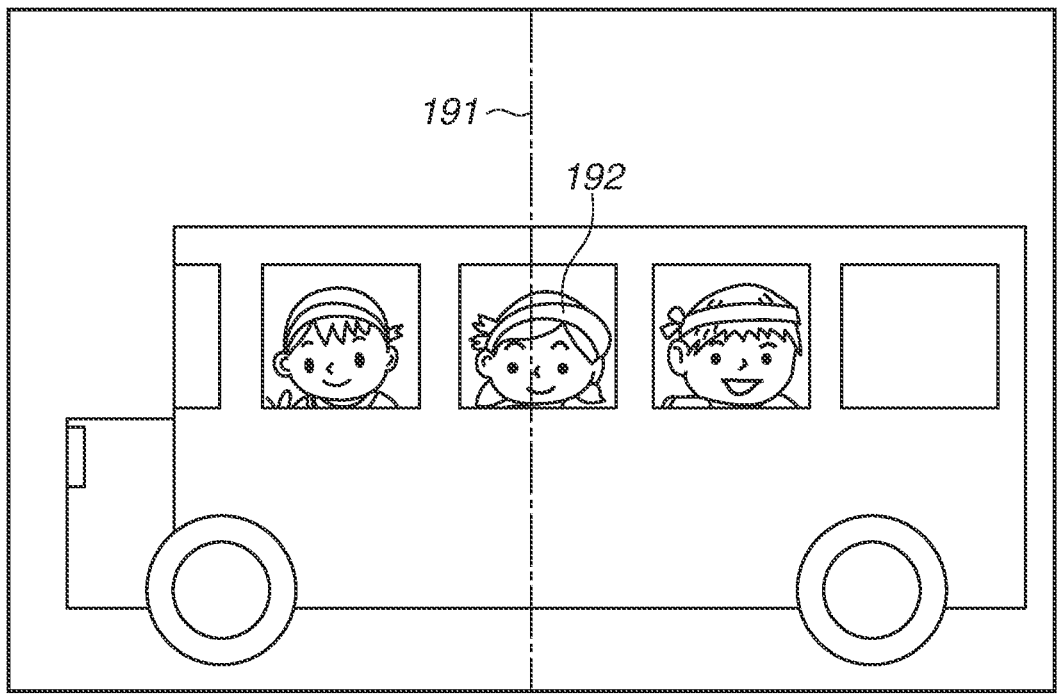
FIG. 19A is a diagram illustrating a case of displaying a grid line on a display screen to be displayed in processing to be executed in the sixth exemplary embodiment.
Figure 19B:
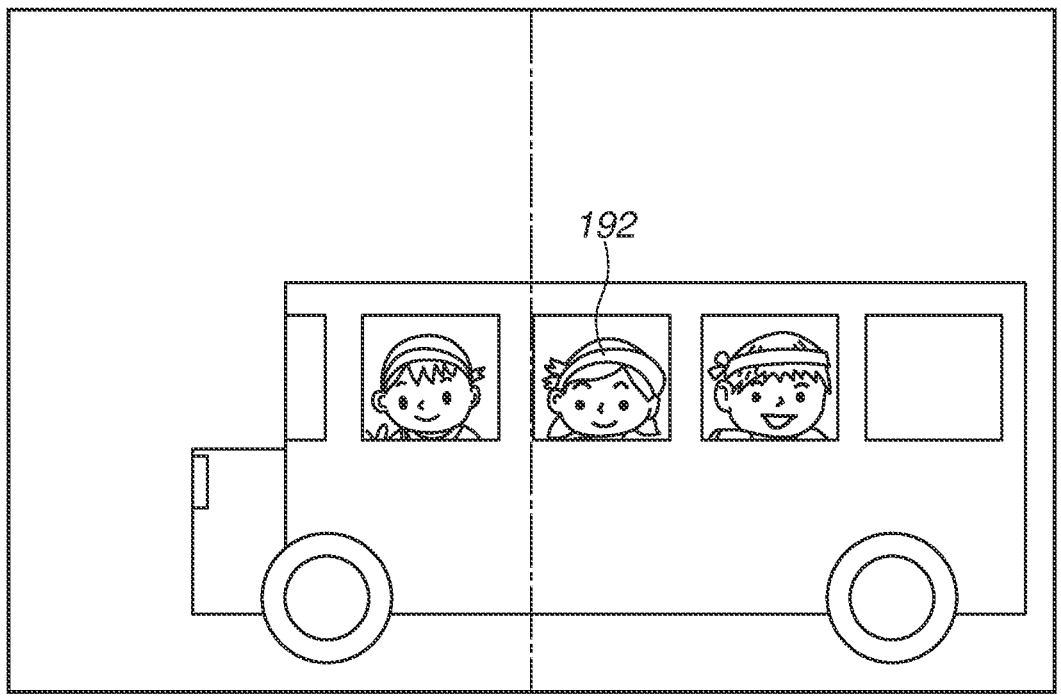
FIG. 19B is a diagram illustrating a case of displaying a grid line on a display screen to be displayed in processing to be executed in the sixth exemplary embodiment.

In a case where a size in which printing is desired to be executed and a print sheet size are different, and divided printing is performed, including the case of the above-described full scale printing, for example, a grid line is displayed in a superimposed manner in a work image region in such a manner that a dividing position is identifiable. By displaying a grid line, a composite image to be divided in printing is made identifiable. FIG. 19A illustrates an example in which a grid line 191 is indicated at a divided position in a case where an A3-sized print output is to be obtained using A4-sized print sheets. It is easily recognized that a face 192 exists on the dividing line, and is to be printed in a divided manner. Thus, the user can easily move an important composite image such as a face image to a position that does not cause the image to be divided in printing. For example, by reducing the entire arranged image and moving the reduced image rightward as illustrated in FIG. 19B, the face 192 can be rearranged in such a manner as not to be divided in printing. Furthermore, control may be automatically performed in such a manner that a face image is not arranged on a grid line.

In a case where a print sheet size and a desired size for enlargement printing are known, it is desirable to display a dividing grid line in a superimposed manner in a work image region in which a composition work is to be performed.

Further in the print setting, when a desired printing size is set, the resolution of an arranged composite image is checked, and a composite image having a large image enlargement ratio which causes a resolution to decrease at the time of printing is extracted and notified in an identifiable manner.

As described above, according to the image composition application of the present exemplary embodiment, in addition to composition that uses object side pixel dimension information, an image having no object side pixel dimension information can also be combined by estimating dimension information. By making the presence or absence of object side pixel dimension information identifiable, the user can perform image composition while checking the dimension accuracy of a subject.

Modified Example of Sixth Exemplary Embodiment

A modified example of the sixth exemplary embodiment will be described. As described in the sixth exemplary embodiment, in an image for which only distance information of a focus position is stored, a plurality of faces may exist at positions other than the focus position in the image. In such a case, processing of enabling full scale printing of a face appearing in a distance other than the focus position will be described.

The control unit 16 or the image processing unit 22 estimates an object side pixel dimension by assuming a general face size for the face appearing in a distance other than the focus position. The estimated object side pixel dimension or PPI information is additionally stored in the metadata of the image together with detected face region information. By selecting a face desired to be printed in full scale at the time of printing, approximate full scale printing can be executed.

Other Exemplary Embodiments

The present invention can also be executed by processing of supplying a program for implementing one or more functions of the above-described exemplary embodiments, to a system or an apparatus via a network or a storage medium, and one or more processors in a computer of the system or the apparatus reading out and executing the program. Furthermore, the present invention can also be realized by a circuit (e.g., application specific integrated circuit (ASIC)) for implementing the one or more functions.

The present invention is not limited to the above-described exemplary embodiments, and various changes and modifications can be made without departing from the spirit and scope of the present invention. The following claims are therefore appended for setting forth the scope of the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it becomes possible to generate an image in which a dimension of a subject existing at a desired position in an image is more accurate and clearer. It also becomes possible to perform dimension comparison between subjects utilizing a dimension of a subject existing at a desired position in an image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image processing apparatus comprising:
an acquisition unit configured to acquire an image captured by an imaging unit, and image capturing information at the time of image capturing of the image;
a calculation unit configured to calculate an object side pixel dimension of a target subject in the image based on the image capturing information and a pixel dimension of the imaging unit; and
an image processing unit configured to process the image captured by the imaging unit, based on the object side pixel dimension,
wherein the acquisition unit acquires in-focus information indicating an in-focus state of a subject in an image, as the image capturing information,
wherein the calculation unit calculates the object side pixel dimension based on the in-focus information, and
wherein, in a subject region in which calculation of the object side pixel dimension has failed, the image processing unit estimates the object side pixel dimension of the subject region in which calculation of the object side pixel dimension has failed, by using a size of a subject region detected by a subject detection unit, and a size of a subject region detected by the subject detection unit in a subject region in which the object side pixel dimension has been calculated, and calculates an estimated object side pixel dimension.

2. The image processing apparatus according to claim 1, wherein the acquisition unit acquires output destination information regarding an output destination device that outputs the image, and
wherein the image processing unit generates an output image by converting the image based on the output destination information in such a manner that a subject of the image is in full scale in an output on the output destination device, based on the object side pixel dimension calculated by the calculation unit.

3. The image processing apparatus according to claim 1, wherein the image processing unit records information into image data in such a manner that the object side pixel dimension and the estimated object side pixel dimension are discriminable.

4. The image processing apparatus according to claim 1, wherein, when a plurality of subjects having the object side pixel dimension are combined into one image, by selecting one subject from the plurality of subjects and changing a size of the subject, the image processing unit changes a size of a subject having the object side pixel dimension that is other than the subject while maintaining a relative size.

5. The image processing apparatus according to claim 1, wherein, using the number of pixels of a subject detected by subject detection and the object side pixel dimension, the image processing unit calculates a size of the subject, and in a case where a calculated dimension of the subject is larger or smaller than a prestored dimension of the subject by a threshold value or more, the image processing unit performs subject clipping based on the prestored dimension of the subject.

6. The image processing apparatus according to claim 1, wherein, in a case where full scale printing is set, the image processing unit calculates a size of a printed product using the object side pixel dimension of a main subject, and generates a divided image for printing based on a set sheet size.

7. The image processing apparatus according to claim 1, wherein, by using the object side pixel dimension of each of a plurality of subjects in an image, the image processing unit converts images of the plurality of subjects in accordance with actual sizes, and generates an image by which dimensions of the plurality of subjects are relatively compared.

8. The image processing apparatus according to claim 1, wherein the calculation unit calculates the object side pixel dimension based on at least any one of a variation amount of a focal length corresponding to the in-focus information, a subject distance, and a principal point position of an optical system.

9. The image processing apparatus according to claim 1, wherein, using a subject distance to an in-focus subject as the image capturing information, the calculation unit calculates the object side pixel dimension in the subject distance.

10. The image processing apparatus according to claim 1, wherein the calculation unit calculates the object side pixel dimension based on an image capturing magnification corresponding to the in-focus information.

11. The image processing apparatus according to claim 1, wherein the acquisition unit acquires depth distribution information corresponding to the image, and wherein the calculation unit calculates the object side pixel dimension at each pixel position of the depth distribution information using the depth distribution information.

12. The image processing apparatus according to claim 11, wherein the calculation unit acquires a subject distance to at least one subject existing at an arbitrary position in the image, using the depth distribution information, and calculates the object side pixel dimension in the subject distance using the subject distance.

13. The image processing apparatus according to claim 11, wherein the depth distribution information is at least any one of distribution information of a parallax amount indicated by a phase difference signal corresponding to the image, distribution information of a defocus amount of a subject existing in the image, and distribution information of a subject distance to a subject existing in the image.

14. The image processing apparatus according to claim 1, wherein the output destination information is information regarding at least any one of a print sheet dimension, a display screen dimension, and a display screen resolution.

15. The image processing apparatus according to claim 1, further comprising a control unit configured to calculate the number of pixels per at least one unit length from an object side pixel dimension calculated by the calculation unit, and record the number of pixels per unit length in association with a corresponding image.

16. The image processing apparatus according to claim 15, wherein the control unit records, as the number of pixels per unit length, pixel per inch (PPI) information into an image file in an Exchangeable image file format (Exif) format together with image data of a corresponding image.

17. The image processing apparatus according to claim 15,
wherein, by executing face detection processing on the image and executing the calculation unit using a subject distance of a detected face region, the image processing unit calculates an object side pixel dimension or the number of pixels per unit length of at least one region of the image, and
wherein the control unit records at least either one of the object side pixel dimension and the number of pixels per unit length in association with the corresponding image.

18. The image processing apparatus according to claim 1, wherein, based on the number of pixels of a region that is designated by a graphical user interface (GUI) to be superimposed on the image, the control unit calculates a dimension of the region that is designated by the GUI, from the object side pixel dimension, and displays the dimension on a display unit.

19. An imaging apparatus comprising:
an image sensor configured to acquire a phase difference signal from a plurality of photoelectric conversion units;
the image processing apparatus according to claim 1; and
a conversion unit.

20. A display device comprising:
the image processing apparatus according to claim 1; and
a display unit configured to display the image.

21. A printing apparatus comprising:
the image processing apparatus according to claim 1; and
a printing unit configured to print the image.

22. An image processing method comprising:
acquiring an image captured by an imaging unit, and image capturing information at the time of image capturing of the image; and
calculating an object side pixel dimension of a subject in the image based on the image capturing information and a pixel dimension of the imaging unit; and
processing the image captured by the imaging unit, based on the object side pixel dimension,
wherein, in the acquiring, in-focus information indicating an in-focus state of a subject in an image is acquired as the image capturing information,
wherein, in the calculating, the object side pixel dimension is calculated based on the in-focus information, and
wherein, in a subject region in which calculation of the object side pixel dimension has failed, the processing estimates the object side pixel dimension of the subject region in which calculation of the object side pixel dimension has failed, by using a size of a subject region detected by a subject detection unit, and a size of a subject region detected by the subject detection unit in a subject region in which the object side pixel dimension has been calculated, and calculates an estimated object side pixel dimension.

23. A non-transitory storage medium storing a program for causing a computer to execute a procedure to be executed by each unit of the image processing apparatus according to claim 1.

* * * * *